United States Patent
Hosotsubo et al.

(10) Patent No.: US 9,092,431 B2
(45) Date of Patent: Jul. 28, 2015

(54) DOCUMENT MANAGEMENT SYSTEM AND DOCUMENT MANAGEMENT METHOD FOR DETERMINING WHETHER AT LEAST ONE MANAGED DOCUMENT WAS PRINTED AND UPDATING PRINT INFORMATION OF THE AT LEAST ONE MANAGED DOCUMENT BASED ON THE DETERMINATION

(75) Inventors: Toshihiko Hosotsubo, Kamakura (JP); Kentaro Suzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 13/595,273

(22) Filed: Aug. 27, 2012

(65) Prior Publication Data

US 2013/0050756 A1    Feb. 28, 2013

(30) Foreign Application Priority Data

Aug. 31, 2011   (JP) .................. 2011-189025

(51) Int. Cl.
*G06F 3/12* (2006.01)
*G06F 17/30* (2006.01)
*H04N 1/32* (2006.01)
*H04N 1/00* (2006.01)

(52) U.S. Cl.
CPC ...... *G06F 17/30011* (2013.01); *H04N 1/00344* (2013.01); *H04N 1/32101* (2013.01); *G06F 3/1203* (2013.01); *G06F 3/1273* (2013.01); *G06F 3/1285* (2013.01); *H04N 1/00877* (2013.01); *H04N 2201/0094* (2013.01); *H04N 2201/3202* (2013.01); *H04N 2201/3205* (2013.01)

(58) Field of Classification Search
None
See application file for complete search history.

(56) References Cited

U.S. PATENT DOCUMENTS

| 8,314,952 | B2* | 11/2012 | Ohta ........................... 358/1.14 |
| 2006/0103872 | A1* | 5/2006 | Shimogori .................. 358/1.15 |
| 2006/0158681 | A1* | 7/2006 | Yorimoto et al. ........... 358/1.15 |
| 2007/0271592 | A1* | 11/2007 | Noda et al. ...................... 726/1 |
| 2009/0293135 | A1* | 11/2009 | Nanaumi ........................ 726/28 |

FOREIGN PATENT DOCUMENTS

JP    2007-122685 A    5/2007

* cited by examiner

*Primary Examiner* — Miya J Cato
(74) *Attorney, Agent, or Firm* — Canon USA, Inc., IP Division

(57) ABSTRACT

A document management system includes a document operation log recording unit configured to record as an operation log a history of operations for each document managed by the document management system, a print log collecting unit configured to collect a print log indicating a history of printing executed by a printing device, a log comparison unit configured to compare the operation log recorded by the document operation log recording unit with the print log collected by the print log collecting unit, a document printing determination unit configured to determine, based on a result of comparison by the log comparison unit, whether each document managed by the document management system was printed, and a document print information updating unit configured to update, based on a result of determination by the document printing determination unit, print information of each document managed by the document management system.

13 Claims, 21 Drawing Sheets

FIG.4A

| | DOCUMENT OPERATION LOG ID 402 | DOCUMENT ID 403 | DOCUMENT PATH 404 | DOCUMENT NAME 405 | OPERATION USER 406 | OPERATION TYPE 407 | DATE AND TIME OF OPERATION 408 | PRINT DETERMINATION COMPLETED 409 |
|---|---|---|---|---|---|---|---|---|
| 421 | ope411 | doc7 | Eigyo-bu/SALES PROMOTION/ 12345678901234567890 123456789012345.txt | 12345678901234567890 123456789012345.txt | user5 | OPEN | MARCH 1, 2011 08:09:10 | |
| 422 | ope412 | doc7 | Eigyo-bu/SALES PROMOTION/ 12345678901234567890 123456789012345.txt | 12345678901234567890 123456789012345.txt | user5 | UPDATE | MARCH 1, 2011 08:12:31 | |
| 423 | ope413 | doc5 | Eigyo-bu/ESTIMATE SHEET/ DOCUMENT 3.ppt | DOCUMENT 3.ppt | user3 | OPEN | MARCH 1, 2011 08:34:01 | |
| 424 | ope414 | doc1 | Eigyo-bu/ESTIMATE SHEET/ DOCUMENT 1.pdf | DOCUMENT 1.pdf | user1 | OPEN | MARCH 1, 2011 09:00:11 | |
| 425 | ope415 | doc3 | Eigyo-bu/ESTIMATE SHEET/ FINAL DECISION SHEET A.docx | FINAL DECISION SHEET A.docx | user2 | OPEN | MARCH 1, 2011 09:08:56 | |
| 426 | ope416 | doc2 | Eigyo-bu/ESTIMATE SHEET/ DOCUMENT 2.xlsx | DOCUMENT 2.xlsx | user1 | REGISTER NEW DOCUMENT | MARCH 1, 2011 09:10:00 | |
| 427 | ope417 | doc8 | Eigyo-bu/SALES PROMOTION/ EventSummary_001.docx | EventSummary_001.docx | user7 | OPEN | MARCH 1, 2011 09:13:20 | |
| 428 | ope418 | doc9 | Eigyo-bu/SALES PROMOTION/ EventSummary_002.docx | EventSummary_002.docx | user7 | OPEN | MARCH 1, 2011 09:13:22 | |
| 429 | ope419 | doc4 | Eigyo-bu/SALES PROMOTION/ MEMORANDUM.txt | MEMORANDUM.txt | user1 | DELETE | MARCH 1, 2011 09:25:34 | |
| 430 | ope420 | doc6 | Eigyo-bu/SALES PROMOTION/ DOCUMENT 3.doc | DOCUMENT 3.doc | user3 | REGISTER NEW DOCUMENT | MARCH 1, 2011 09:36:24 | |

| | DOCUMENT OPERATION LOG ID 402 | DOCUMENT ID 403 | DOCUMENT PATH 404 | DOCUMENT NAME 405 | OPERATION USER 406 | OPERATION TYPE 407 | DATE AND TIME OF OPERATION 408 | PRINT DETERMINATION COMPLETED 409 |
|---|---|---|---|---|---|---|---|---|
| 421 | ope411 | doc7 | Eigyo-bu/SALES PROMOTION/ 12345678901234567890123456789012345.txt | 12345678901234567890123456789012345.txt | user5 | OPEN | MARCH 1, 2011 08:09:10 | job516 |
| 422 | ope412 | doc7 | Eigyo-bu/SALES PROMOTION/ 12345678901234567890123456789012345.txt | 12345678901234567890123456789012345.txt | user5 | UPDATE | MARCH 1, 2011 08:12:31 | |
| 423 | ope413 | doc5 | Eigyo-bu/ESTIMATE SHEET/ DOCUMENT 3.ppt | DOCUMENT 3.ppt | user3 | OPEN | MARCH 1, 2011 08:34:01 | job513 |
| 424 | ope414 | doc1 | Eigyo-bu/ESTIMATE SHEET/ DOCUMENT 1.pdf | DOCUMENT 1.pdf | user1 | OPEN | MARCH 1, 2011 09:00:11 | job511 |
| 425 | ope415 | doc3 | Eigyo-bu/ESTIMATE SHEET/ FINAL DECISION SHEET A.docx | FINAL DECISION SHEET A.docx | user2 | OPEN | MARCH 1, 2011 09:08:56 | job515 |
| 426 | ope416 | doc2 | Eigyo-bu/ESTIMATE SHEET/ DOCUMENT 2.xlsx | DOCUMENT 2.xlsx | user1 | REGISTER NEW DOCUMENT | MARCH 1, 2011 09:10:00 | job512 |
| 427 | ope417 | doc8 | Eigyo-bu/SALES PROMOTION/ EventSummary_001.docx | EventSummary_001.docx | user7 | OPEN | MARCH 1, 2011 09:13:20 | job517 |
| 428 | ope418 | doc9 | Eigyo-bu/SALES PROMOTION/ EventSummary_002.docx | EventSummary_002.docx | user7 | OPEN | MARCH 1, 2011 09:13:22 | |
| 429 | ope419 | doc4 | Eigyo-bu/SALES PROMOTION/ MEMORANDUM.txt | MEMORANDUM.txt | user1 | DELETE | MARCH 1, 2011 09:25:34 | |
| 430 | ope420 | doc6 | Eigyo-bu/SALES PROMOTION/ DOCUMENT 3.doc | DOCUMENT 3.doc | user3 | REGISTER NEW DOCUMENT | MARCH 1, 2011 09:36:24 | |

| 501 | 502 | 503 | 504 | 505 | 506 | 507 | 508 | 509 | 510 |
|---|---|---|---|---|---|---|---|---|---|
| | PRINT LOG ID | PRINTER NAME | JOB NAME | PRINT USER | DATE AND TIME OF PRINT START | NUMBER OF PRINTED SHEETS | IMPOSITION INFORMATION | TWO-SIDED PRINTING | CORRESPONDENCE DETERMINATION COMPLETED |
| 521 | job511 | MFP2XXX | DOCUMENT 1.pdf | user1 | MARCH 1, 2011 09:05:42 | 1 | 4in1 | | |
| 522 | job512 | MFP2XXX | DOCUMENT 2.xlsx | user1 | MARCH 1, 2011 09:07:55 | 1 | 2in1 | YES | |
| 523 | job513 | MFP3XXX | Microsoft PowerPoint - DOCUMENT 3.ppt [COMPATIBLE MODE] | user3 | MARCH 1, 2011 09:08:40 | 3 | 2in1 | | |
| 524 | job514 | MFP3XXX | DOCUMENT 1.pdf | user2 | MARCH 1, 2011 09:10:58 | 1 | | YES | |
| 525 | job515 | MFP3XXX | Microsoft Word - FINAL DECISION SHEET A.docx | user2 | MARCH 1, 2011 09:14:20 | 1 | | YES | |
| 526 | job516 | LBP4YYY | 12345678901234567890 123456789012 | user5 | MARCH 1, 2011 09:02:28 | 4 | | YES | |
| 527 | job517 | LBP4YYY | Microsoft Word - EventSummary_00 | user7 | MARCH 1, 2011 09:14:11 | 4 | 2in1 | YES | |

FIG.5B

| | PRINT LOG ID 502 | PRINTER NAME 503 | JOB NAME 504 | PRINT USER 505 | DATE AND TIME OF PRINT START 506 | NUMBER OF PRINTED SHEETS 507 | IMPOSITION INFORMATION 508 | TWO-SIDED PRINTING 509 | CORRESPONDENCE DETERMINATION COMPLETED 510 |
|---|---|---|---|---|---|---|---|---|---|
| 521 | job511 | MFP2XXX | DOCUMENT 1.pdf | user1 | MARCH 1, 2011 09:05:42 | 1 | 4in1 | | ope414 |
| 522 | job512 | MFP2XXX | DOCUMENT 2.xlsx | user1 | MARCH 1, 2011 09:07:55 | 1 | 2in1 | YES | ope416 |
| 523 | job513 | MFP3XXX | Microsoft PowerPoint - DOCUMENT 3.ppt [COMPATIBLE MODE] | user3 | MARCH 1, 2011 09:08:40 | 3 | 2in1 | | ope413 |
| 524 | job514 | MFP3XXX | DOCUMENT 1.pdf | user2 | MARCH 1, 2011 09:10:58 | 1 | | YES | |
| 525 | job515 | MFP3XXX | Microsoft Word - FINAL DECISION SHEET A.docx | user2 | MARCH 1, 2011 09:14:20 | 4 | | YES | ope415 |
| 526 | job516 | LBP4YYY | 12345678901234567890 123456789012 | user5 | MARCH 1, 2011 09:02:28 | 4 | 2in1 | YES | ope411 |
| 527 | job517 | LBP4YYY | Microsoft Word - EventSummary_00 | user7 | MARCH 1, 2011 09:14:11 | | | YES | ope417 |

| | EXTERNAL APPLICATION PRINT LOG ID | DOCUMENT ID | DOCUMENT PATH | DOCUMENT NAME | PRINT USER | DATE AND TIME OF PRINT START |
|---|---|---|---|---|---|---|
| 621 | exprint1 | doc7 | Eigyo-bu/SALES PROMOTION/ 12345678901234567890123456789012345.txt | 1234567890123456789012345 6789012345.txt | user5 | MARCH 1, 2011 09:02:28 |
| 622 | exprint2 | doc5 | Eigyo-bu/ESTIMATE SHEET/ DOCUMENT 3.ppt | DOCUMENT 3.ppt | user3 | MARCH 1, 2011 09:08:40 |
| 623 | exprint3 | doc1 | Eigyo-bu/ESTIMATE SHEET/ DOCUMENT 1.pdf | DOCUMENT 1.pdf | user1 | MARCH 1, 2011 09:05:42 |
| 624 | exprint4 | doc3 | Eigyo-bu/ESTIMATE SHEET/ FINAL DECISION SHEET A.docx | FINAL DECISION SHEET A.docx | user2 | MARCH 1, 2011 09:14:20 |
| 625 | exprint5 | doc8 | Eigyo-bu/SALES PROMOTION/ EventSummary_001.docx | EventSummary_001.docx | user7 | MARCH 1, 2011 09:14:11 |
| 626 | exprint6 | doc2 | Eigyo-bu/ESTIMATE SHEET/ DOCUMENT 2.xlsx | DOCUMENT 2.xlsx | user1 | MARCH 1, 2011 09:07:55 |

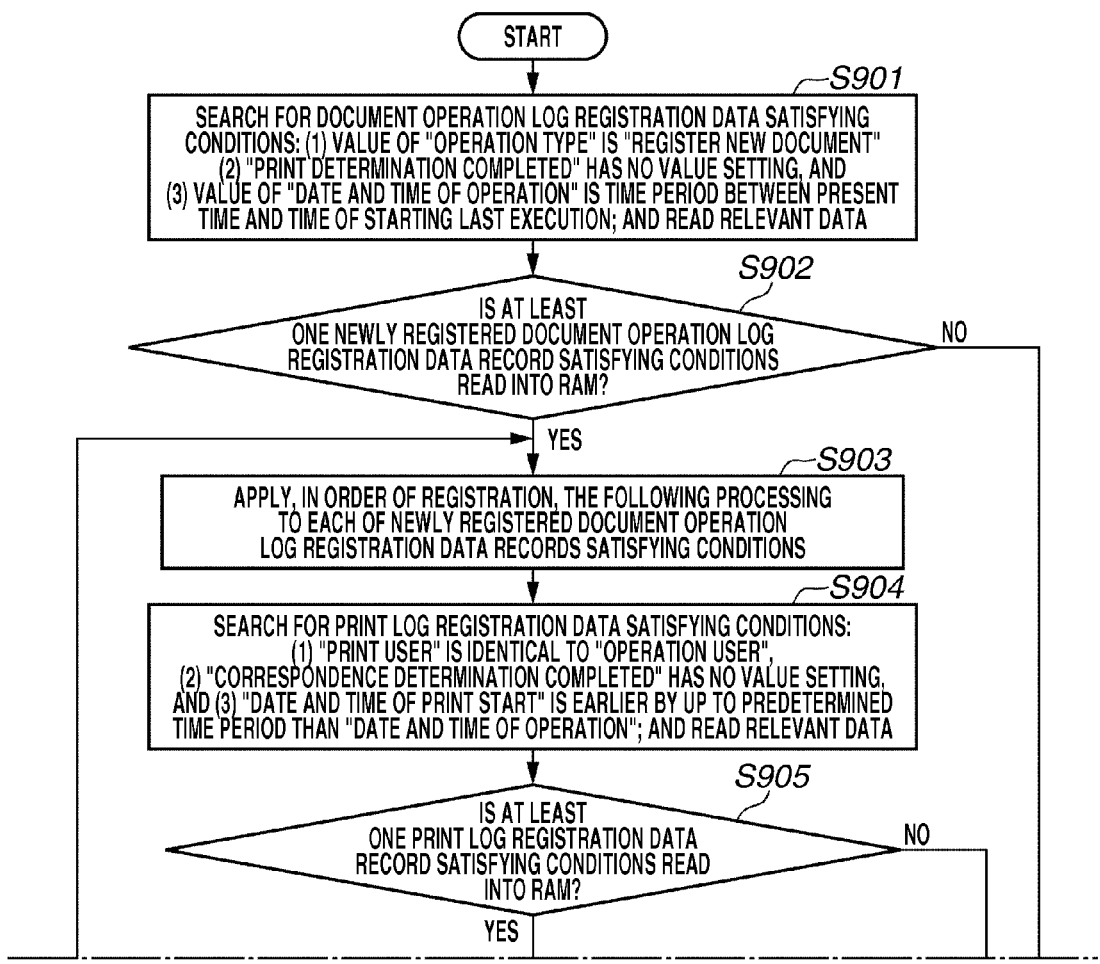
FIG.9A

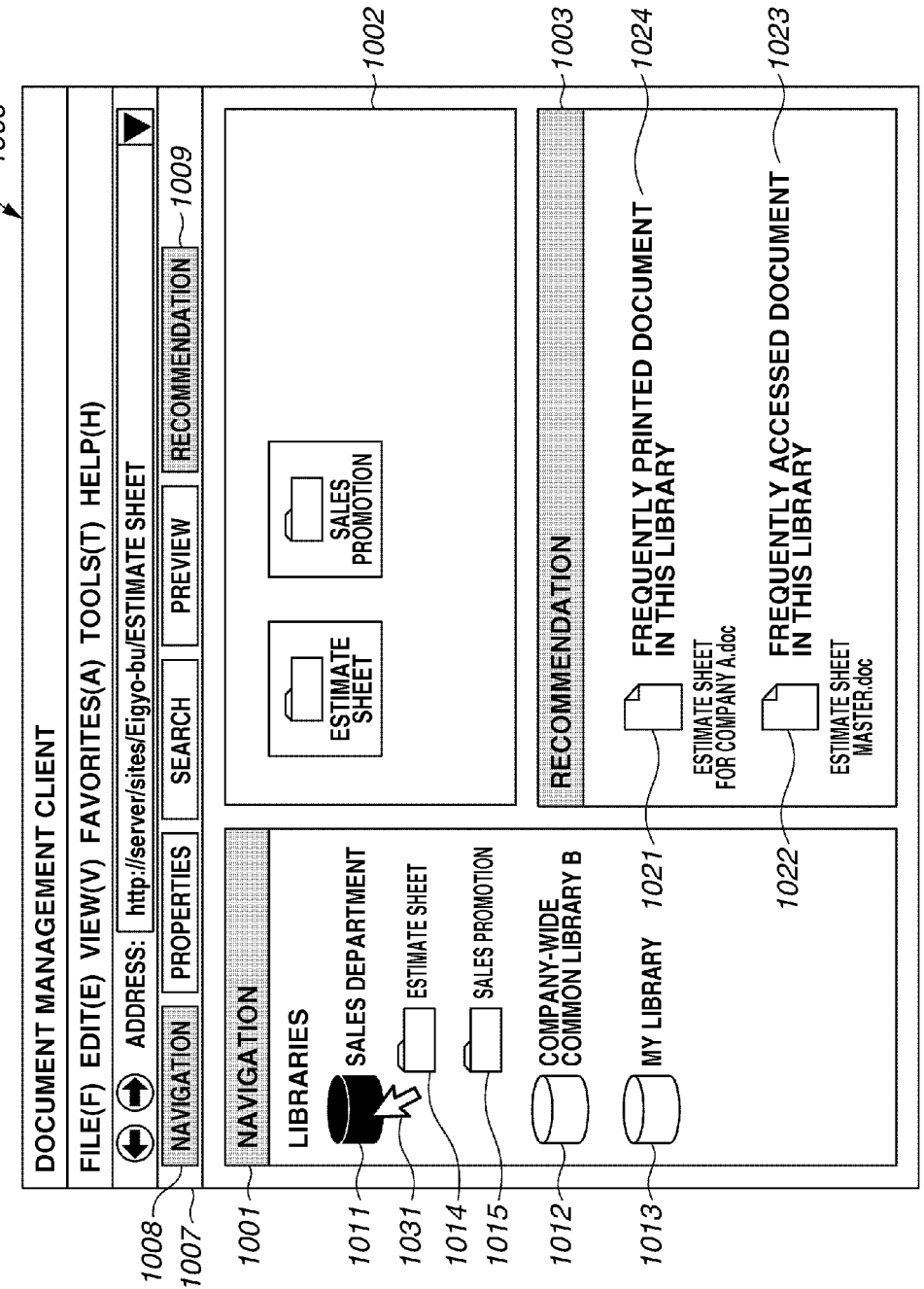

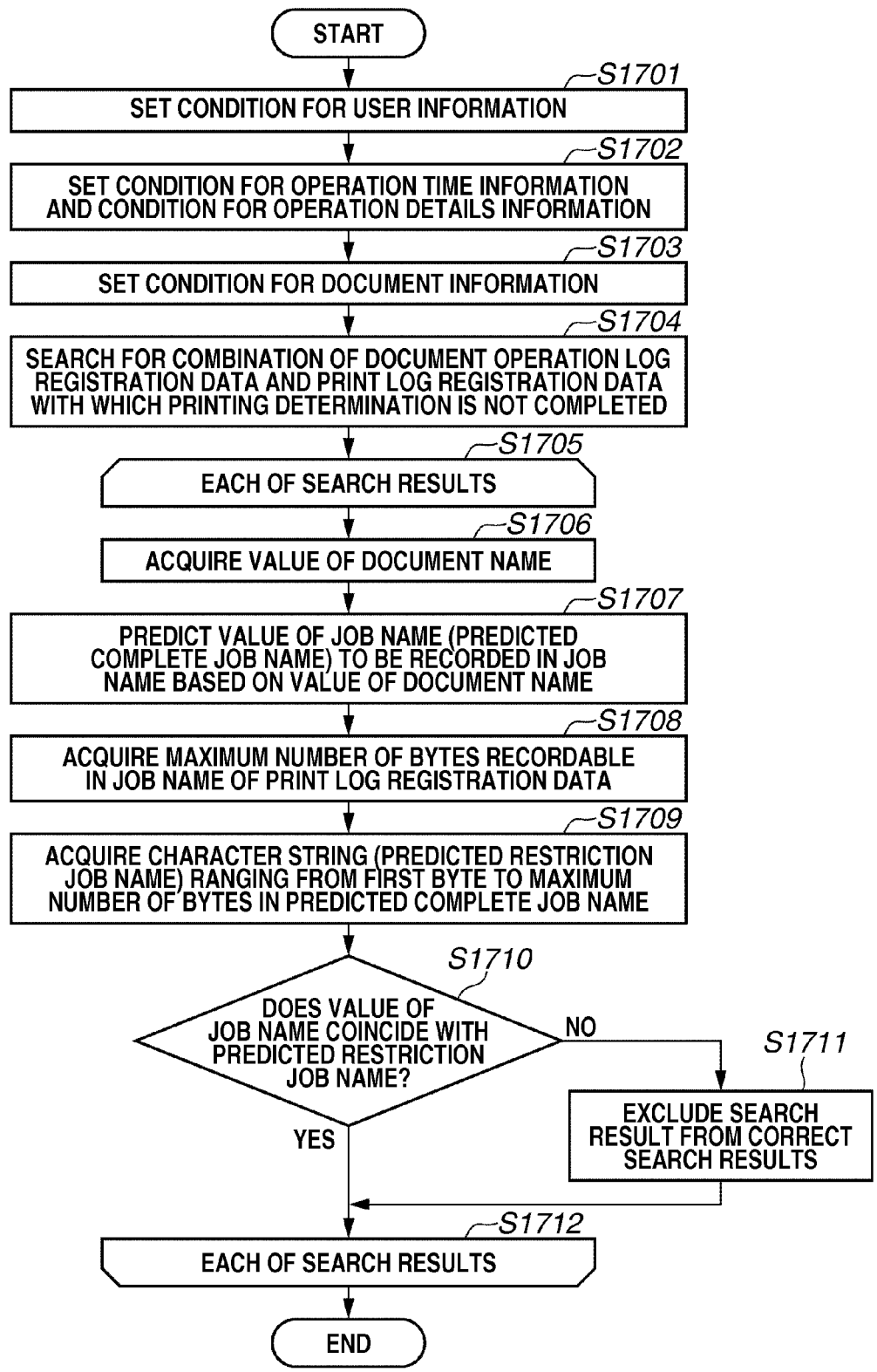

DOCUMENT MANAGEMENT SYSTEM AND DOCUMENT MANAGEMENT METHOD FOR DETERMINING WHETHER AT LEAST ONE MANAGED DOCUMENT WAS PRINTED AND UPDATING PRINT INFORMATION OF THE AT LEAST ONE MANAGED DOCUMENT BASED ON THE DETERMINATION

BACKGROUND OF THE INVENTION

1. Field of the Invention

The present invention relates to a technique for determining, when a document under management by a document management system was opened by an application different from a document management application, whether the document was printed, and to a technique for using the result of the determination.

2. Description of the Related Art

It is considered that the importance of each document is determined based on the number of times of viewing and the number of times of printing of each document managed by the document management system.

A technique discussed in Japanese Patent Application Laid-Open No. 2007-122685 acquires the importance of each document based on a viewing log. Specifically, the technique determines a document identifier (ID) of the viewing log recorded in a viewing log database of a document management server and acquires the number of times of viewing of a document having a document ID=i. The technique further acquires the importance of each document based on a print log. Specifically, the technique determines a document ID of the print log recorded in a print log database of a print server and acquires the number of times of printing of a document having a document ID=i. The technique integrates the importance based on the viewing log and the importance based on the print log to determine the importance of the document having a document ID=i.

The technique discussed in Japanese Patent Application Laid-Open No. 2007-122685 requires that the document ID recorded in the viewing log and the document ID recorded in the print log are identical.

However, a general document management server gives an original document ID to each document (file) to enable document management by the document management server. On the other hand, the print server, when receiving a print job from various application programs and performing print processing, gives a print log ID to each print job, and records each print job in the print log. This causes a problem that the document ID recorded in the viewing log of the document management server and the print log ID recorded in the print log of the print server are not identical in many cases.

On the other hand, recording as an operation log all operations performed on the document management system instead of using the print log of the print server is assumed to enable determining whether a print operation was instructed for a document managed by the document management system. Specifically, the document management system including a document management server and a document management client records print operations performed on the document management client in the operation log of the document management server, and determines based on the operation log that a document managed by the document management server was printed. A print operation in the document management client includes selecting a desired document from a document list displayed by a document management client application, and selecting "PRINT" from an operation menu of the document management client application. Thus, when "PRINT" is selected from the operation menu of the document management client application, a print operation is recorded in the operation log of the document management server.

However, a general document management system downloads a document managed by the document management server to a client personal computer (PC) enables an application different from the document management client application (hereinafter referred to as external application) to open the relevant document. For example, a document file locally downloaded from the document management server can be opened by using an external application such as a word processor application and a spreadsheet application. When a user activates an external application, opens a document, and performs print operation for the document, operations performed by the external application are not recorded in the operation log of the document management server. Therefore, print operations performed by the external application are not recorded in the operation log, either. Specifically, when PRINT is executed from the operation menu of the external application, since printing is instructed out of the management by the document management system, the document management system cannot record the print operation and therefore cannot determine whether the relevant document was printed.

Such a problem arising when a document is opened and printed by using an external application also arises under environmental conditions as in Japanese Patent Application Laid-Open No. 2007-122685. Specifically, when a print operation is performed by using an external application out of the management by the document management server, the print job ID recorded in the print server cannot be identical to the document ID recorded in the document management server. In this case, therefore, it becomes difficult to calculate the importance by using the number of times of printing for a document managed by the document management server.

SUMMARY OF THE INVENTION

According to an aspect of the present invention, a documentation management system includes a document operation log recording unit configured to record as an operation log a history of operations for each document managed by the document management system, a print log collecting unit configured to collect a print log indicating a history of printing executed by a printing device, a log comparison unit configured to compare the operation log recorded by the document operation log recording unit with the print log collected by the print log collecting unit, a document printing determination unit configured to determine, based on a result of comparison by the log comparison unit, whether each document managed by the document management system was printed, and a document print information updating unit configured to update, based on a result of determination by the document printing determination unit, print information of each document managed by the document management system.

According to exemplary embodiments of the present invention, the operation log indicating the history of operations for each document managed by the document management system is compared with the print log indicating the history of printing performed by a printing device such as a printer to determine whether a document was printed, enabling determining whether printing was performed by an external application different from a program of the document management system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A illustrates an example document operation log, and FIG. 4B illustrates an example document operation log after execution of flowcharts in FIGS. 8, 9, and 11.

FIG. 5A illustrates an example print log, and FIG. 5B illustrates an example print log after execution of flowcharts in FIGS. 8, 9, and 11.

FIG. 6 illustrates an example external application print log.

FIG. 10 illustrates an example recommendation display for a user interface (UI) unit of the document management client application.

FIG. 17 is a flowchart illustrating processing of search 4 according to the second exemplary embodiment.

DESCRIPTION OF THE EMBODIMENTS

Various exemplary embodiments, features, and aspects of the invention will be described in detail below with reference to the drawings.

Figure 1:
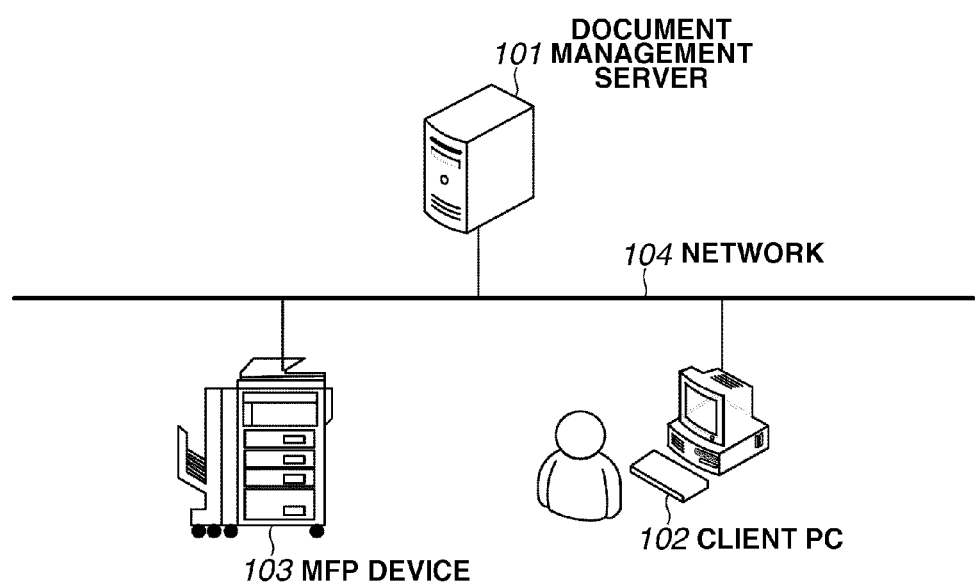
FIG. 1 schematically illustrates a document management system according to a first exemplary embodiment of the present invention.

FIG. 1 schematically illustrates a document management system according to a first exemplary embodiment of the present invention. The document management system includes a document management server 101, a client PC 102, and a multifunction peripheral (MFP) device 103 having printing functions which are all interconnected via a network 104 such as the Internet or a local area network (LAN).

The document management server PC 101 is a server on which a document management server application is operating. The client PC 102 is a PC on which a document management client application is operating. The document management client application accesses the document management server 101 to acquire document information.

In addition to the client PC 102, a plurality of client PCs may be connected to the network 104 (not illustrated in FIG. 1). In addition to the MFP device 103, a plurality of MFP devices may be connected to the network 104.

Figure 2A:
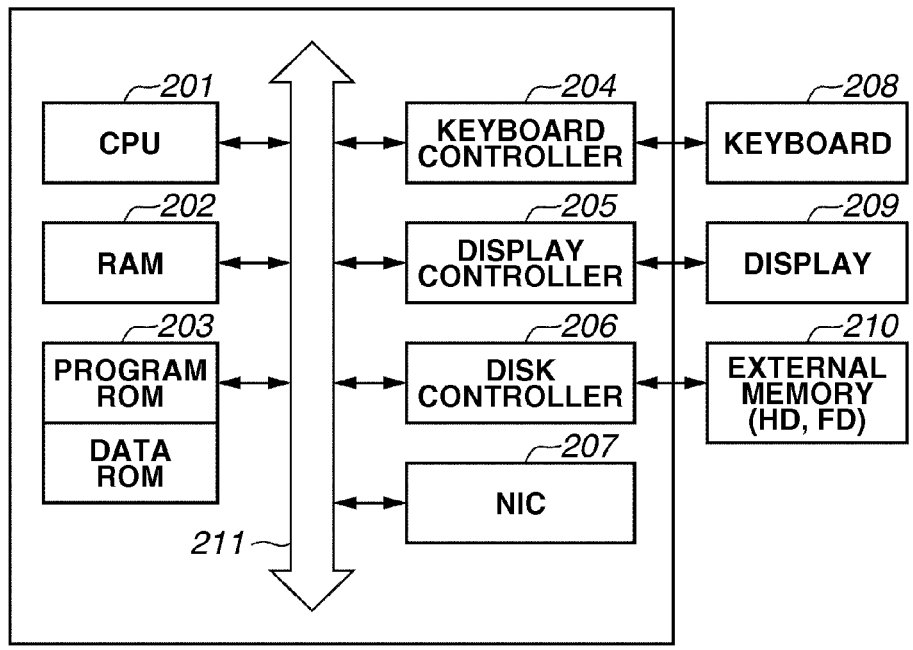
FIGS. 2A and 2B respectively illustrate a hardware configuration of a personal computer (PC) and a multifunction peripheral (MFP) device constituting the document management system.
Figure 2B:
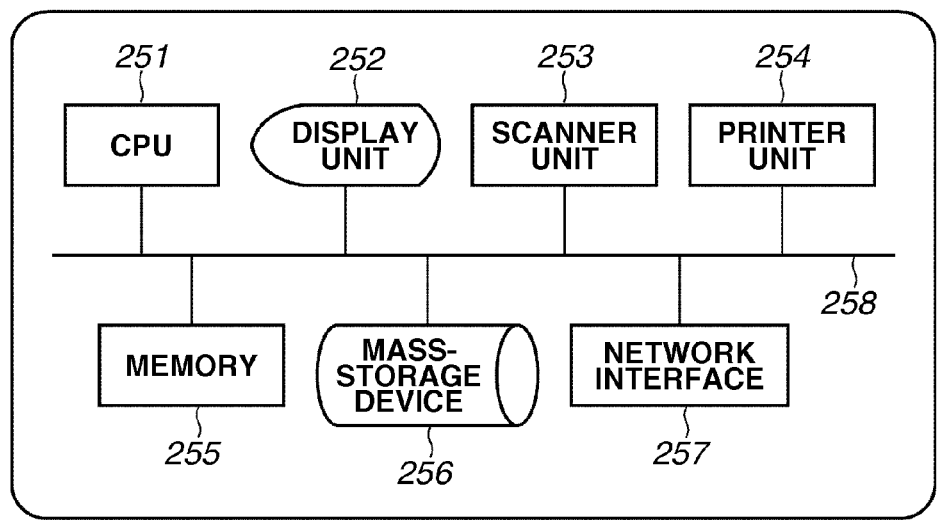

FIGS. 2A and 2B respectively illustrate an example hardware configuration of the PC and the MFP device constituting the document management system according to the present exemplary embodiment. The hardware configuration of a common information processing apparatus as illustrated in FIG. 2A can be applied to the document management server PC and the client PC according to the present exemplary embodiment.

FIG. 2A illustrates a hardware configuration of the information processing apparatus (PC). A central processing unit (CPU) 201 executes programs such as an operating system (OS) and applications loaded into memory (a read-only memory (ROM) 203 and a random access memory (RAM) 202). The operating system (hereinafter abbreviated to and referred to as OS) operates on a computer. Processing of each flowchart described below is implemented when the CPU 201 executes a relevant program. Specifically, the relevant program enables each PC to function as each processing unit for executing each piece of processing of the flowcharts described below. The RAM 202 functions as a main memory for the CPU 201 and also as a work area.

A keyboard controller 204 controls key inputs from a keyboard 208 and a pointing device such as a mouse (not illustrated). A display controller 205 controls display of a display 209 (display device). A disk controller 206 controls data access to/from a hard disk (HD) 210 which is an external memory for storing various data. A network interface controller (NIC) 207 executes processing for controlling communication with other devices connected via the network 104. The hard disk (HD) 210 stores programs such as the OS and applications and various files under control of the OS, i.e., under a file system configured by the OS. An interconnected bus 211 enables communication between blocks under control of the CPU 201.

FIG. 2B illustrates an example hardware configuration of the MFP device 103. Referring to FIG. 2B, a CPU 251 connects functions and apparatuses (described below) via an internal bus 258 to control the MFP device 103. A display unit 252 is, for example, a touch panel (operation panel) for displaying operation screens. In the present exemplary embodiment, a user performs a desired operation via an operation screen displayed on the touch panel of the display unit 252. A scanner unit 253 having an auto document feeder function scans a document. A printer unit 254 prints out a print job received via a network interface 257. A memory 255 functions as a main memory for the CPU 251 and also as a work area used by the CPU 251 to execute programs such as the OS and applications to control the MFP device 103. A mass-storage device 256 stores various application programs to be loaded into the memory 255 by the CPU 251. The mass-storage device 256 is also used to store a document scanned by the scanner unit 253. The network interface 257 executes processing for controlling communication with other devices connected via the network 104. Particularly in the present exemplary embodiment, the network interface 257 is used to perform communication with the document management server PC 101.

Figure 3:
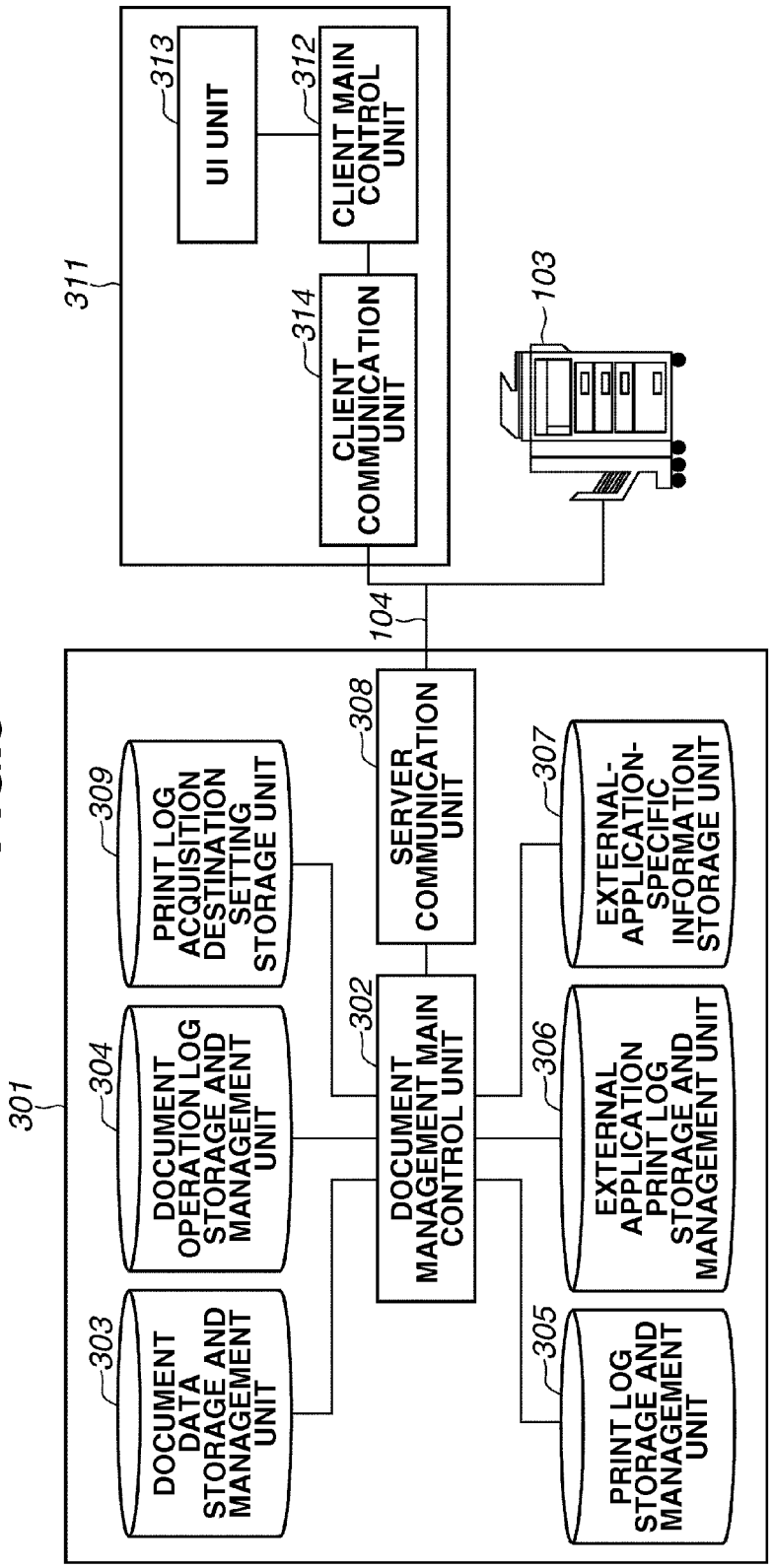
FIG. 3 illustrates a software module configuration of the document management system.

FIG. 3 illustrates a software module configuration of the document management system. A document management server application 301, by being executed on the document management server 101, functions as each of processing units 302 to 309. A document management client application 311, by being executed on the client PC 102, functions as each of processing units 312 to 313.

Upon reception of a document registration request from the document management client application 311, a document management main control unit 302 transfers to a document data storage and management unit 303 registration document data received together with the request.

When the document management main control unit 302 performs a document operation based on a document operation request from the document management client application 311, the document management main control unit 302 generates relevant operation history data and transfers it to the document operation log storage and management unit 304 as information to be registered in the document operation log.

Further, the document management main control unit 302 periodically acquires the print log from a printer such as the MFP device 103 (or the print server) based on information about a target printer for print log acquisition set in a print log acquisition destination setting storage unit 309, and transfers the acquired print log to a print log storage and management unit 305. The print log is generated when a printer such as the MFP device 103 performs print processing for a print job.

Further, the document management main control unit 302 compares a job name in the print log with a document name in the document operation log to determine whether the document was printed by an external application, and generates an external application print log. Details will be described below.

The document data storage and management unit 303 stores in an external memory 210 the document data transferred from the document management main control unit 302 to manage the document data. The document data storage and management unit 303 assigns a unique document ID to each document under management, and manages the attribute of each document under management. In addition to the document ID, the attribute of a document includes a document path indicating the storage location of the document, a document name, a date and time of update, a date and time of creation, a size, a creator, and the number of times of printing.

The document operation log storage and management unit 304 stores in the external memory (hard disk) 210 the document operation log transferred from the document management main control unit 302 to manage the document operation log.

The print log storage and management unit 305 stores in the external memory (hard disk) 210 the print log transferred from the document management main control unit 302 to manage the print log.

An external application print log storage and management unit 306 stores in the hard disk 210 the external application print log generated by the document management main control unit 302 based on the result of the determination of printing by an external application by the document management main control unit 302 to manage the external application print log. Details will be described below.

An external-application-specific information storage unit 307 stores in the hard disk 210 characteristics specific to each external application used by the document management main control unit 302 to compare the job name with the document name. Details will be described below.

A server communication unit 308 transmits and receives via the network 104 data regarding document operations to/from the document management client application 311 and data regarding print log acquisition to/from the MFP device 103.

The print log acquisition destination setting storage unit 309 stores information about a target printer for print log acquisition. Specifically, the print log acquisition destination setting storage unit 309 stores a printer name and an IP address in the hard disk 210 as information about the target printer for print log acquisition.

The document management client application 311 functions as a client main control unit 312, a UI unit 313, and a client communication unit 314. The client main control unit 312 determines a document operation request received from the user via the UI unit 313, and transmits the document operation request to the document management server application 301 via the client communication unit 314. Then, the client main control unit 312 updates display of the UI unit 313 based on the result of a response received from the document management server application 301. The UI unit 313, a user interface for document management, receives various requests such as a request for registering a new document, a request for opening a document, a request for moving a document, and a request for copying a document from the user, and changes display in response to various requests.

The document management main control unit 302 of the document management server acquires the print log of the MFP device 103, for example, by periodically acquiring an updated print log from the MFP device 103. Alternatively, the document management main control unit 302 may make setting to the MFP device 103 for transmitting the print log to the document management server PC 101 and, based on the setting, the MFP device 103 transmits the print log to the document management server PC 101.

FIG. 4A illustrates an example document operation log 401 recorded in the document operation log storage and management unit 304. The document operation log 401 includes the following attributes. Hereinafter, each of data records 421 to 430 registered in the document operation log 401 will be also referred to as document operation log registration data.

Each time the document operation log registration data is transferred from the document management main control unit 302, the document operation log storage and management unit 304 records in a "DOCUMENT OPERATION LOG ID" attribute 402 an ID setting value unique to each document operation log registration data record.

The document ID of the document subjected to operation is recorded in a "DOCUMENT ID" attribute 403. The document ID, a setting value unique to each document by the document data storage and management unit 303 to manage documents, is transferred to the document operation log storage and management unit 304 via the document management main control unit 302 for recording.

When displaying a document as a virtual folder configuration, a value indicating the position of the document subjected to operation is recorded in a "DOCUMENT PATH" attribute 404. The document management main control unit 302 acquires information about a document operation request from the document management client application 311 and necessary information from the document data storage and management unit 303, and transfers values determined based on these pieces of information to the document operation log storage and management unit 304 to record the values.

A value indicating a file name of the document file subjected to operation is recorded in a "DOCUMENT NAME" attribute 405. The document management main control unit 302 acquires information about a document operation request from the document management client application 311 and necessary information from the document data storage and management unit 303, and transfers a value of a file name determined based on these pieces of information to the document operation log storage and management unit 304 to record the value.

A value indicating an account name of the user who operated the document via the document management client application 311 is recorded in an "OPERATION USER" attribute 406. In the present exemplary embodiment, the user's account name is assumed to be unique within the document management system illustrated in FIG. 1. The document management main control unit 302 acquires values from information about a document operation request from the document management client application 311, and transfers the acquired values to the document operation log storage and management unit 304 to record the values.

A type of an operation applied to a document via the document management client application 311 is recorded in an "OPERATION TYPE" attribute 407. The document management main control unit 302 acquires values according to information about a document operation request from the document management client application 311, and transfers the acquired values to the document operation log storage and management unit 304 to record the values. The operation type includes opening a document, deleting a document, and registering a new document.

A value indicating the date and time of operation applied to a document by the user via the document management client application 311 is recorded in a "DATE AND TIME OF OPERATION" attribute 408. The document management main control unit 302 acquires values in response to a document operation request from the document management client application 311, and transfers the acquired values to the document operation log storage and management unit 304 to record the values.

The document management main control unit 302 sets to a "PRINT DETERMINATION COMPLETED" attribute 409 a value of a print log ID attribute of the print log registration data corresponding to the document operation log registration data. Details will be described below. Attributes other than the above may be recorded in the document operation log.

FIG. 5A illustrates an example print log 501 recorded in the print log storage and management unit 305. The print log 501 includes the following attributes. Hereinafter, each of data records 521 to 527 registered in the print log 501 will be also referred to as print log registration data.

Each time the print log acquired from the MFP device 103, etc. is transferred from the document management main control unit 302, the print log storage and management unit 305 records in a "PRINT LOG ID" attribute 502 a setting value unique to each print log registration data record.

The document management main control unit 302 records in the "PRINTER NAME" attribute 503 a unique identifier given to a printer such as the MFP device 103 from which the document management main control unit 302 acquired the relevant print log.

A value of a print job name included in a print job received by the MFP device 103 via the network interface 257 is recorded in a "JOB NAME" attribute 504. Generally, when an application performs printing on a PC by using a printer driver, a value of a print job name included in a print job is transferred from the application to the printer driver. A value of a print job name depends on an application which performs printing. The format of the value is not unified. With many applications, a document name or a part thereof is included in a print job name. The present invention utilizes information about the document name.

A value of a user name included in a print job received by the MFP device 103 via the network interface 257 is set to a "PRINT USER" attribute 505. The printer driver sets an account name of a user (who instructed the application for printing) to the value of the user name included in the print job. In the present exemplary embodiment, an account name of a user is unique within the document management system illustrated in FIG. 1, as described above.

A value indicating the date and time when the printer unit 254 of the MFP device 103 processed a print job relevant to a print log item is recorded in a "DATE AND TIME OF PRINT START" attribute 506.

The number of sheets required when the printer unit 254 of the MFP device 103 normally processed a print job relevant to a print log item is recorded in a "NUMBER OF PRINTED SHEETS" attribute 507.

When the printer unit 254 of the MFP device 103 processes a print job relevant to a print log item, the number of pages laid out on one sheet surface is recorded in an "IMPOSITION INFORMATION" attribute 508. For example, when two pages are laid out on one sheet surface, "2in1" is recorded. When four pages are laid out on one sheet surface, "4in1" is recorded. Generally, imposition (multiple-up printing) is performed based on a value set in a print job according to the setting of the printer driver.

When the printer unit 254 of the MFP device 103 processes a print job relevant to a print log item, a two-sided printing status (whether printing was made on both sides of one sheet) is recorded in a "TWO-SIDED PRINTING" attribute 509. Generally, two-sided printing is performed based on a value set in a print job according to the settings of the printer driver.

A value of the "DOCUMENT OPERATION LOG ID" attribute 402 for the document operation log registration data determined to correspond to the print log registration data by the document management main control unit 302 is set to a "CORRESPONDENCE DETERMINATION COMPLETED" attribute 510 as required. Details will be described below. Attributes other than the above may be recorded in the print log.

FIG. 6 illustrates an example external application print log 601 stored in the external application print log storage and management unit 306. The external application print log 601 includes the following attributes.

Each time external application print log registration data generated by the document management main control unit 302 is transferred, the external application print log storage and management unit 306 records in an "EXTERNAL APPLICATION PRINT LOG ID" attribute 602 a setting value unique to each of the external application print log registration data records.

A "DOCUMENT ID" attribute 603, a "DOCUMENT PATH" attribute 604, and a "DOCUMENT NAME" attribute 605 are equivalent to the attributes 403, 404, and 405 of the document operation log, respectively. A "PRINT USER" attribute 606 and a "DATE AND TIME OF PRINT START" attribute 607 are equivalent to the attributes 505 and 506 of the print log 501, respectively. Attributes other than the above may be recorded in the external application print log.

Figure 8A:
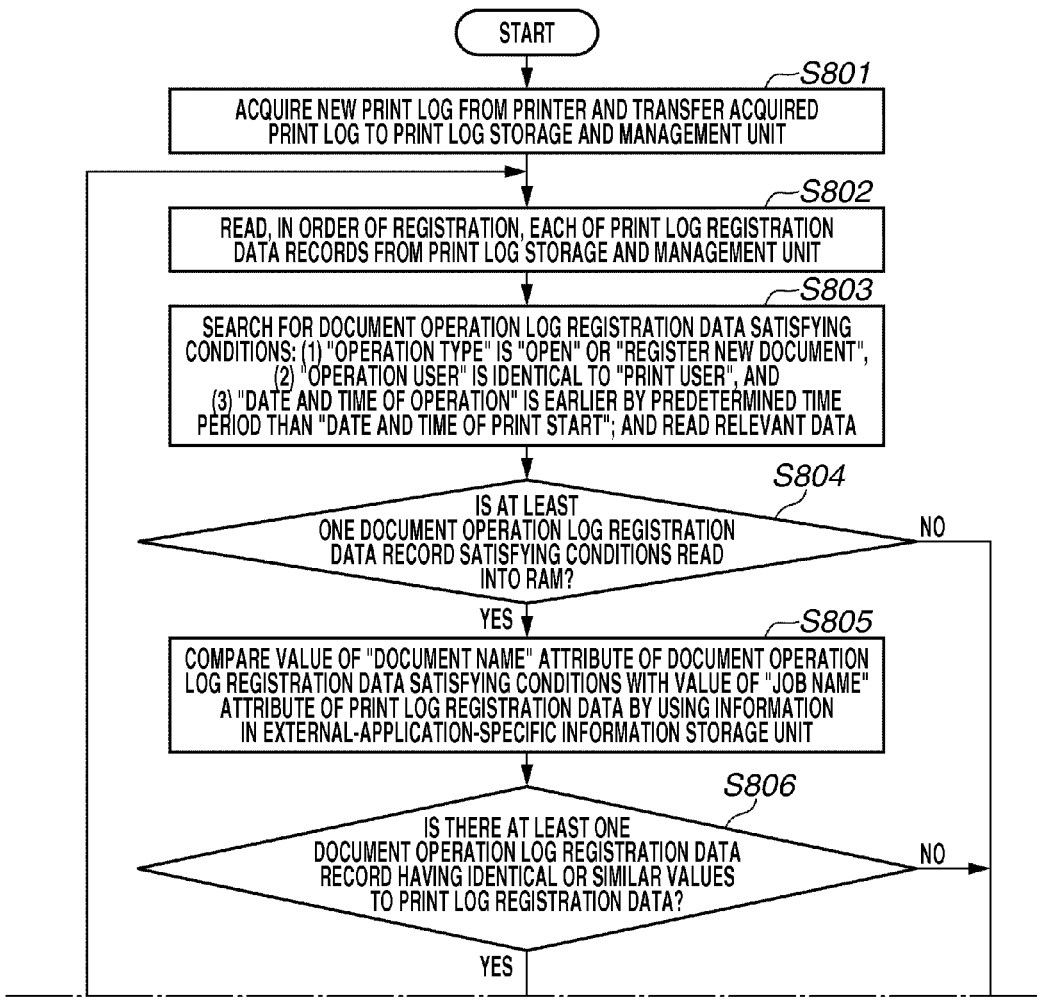
FIG. 8, which is composed of FIGS. 8A and 8B, is a flowchart illustrating printing determination processing for a document managed by a document management server application.
Figure 8B:
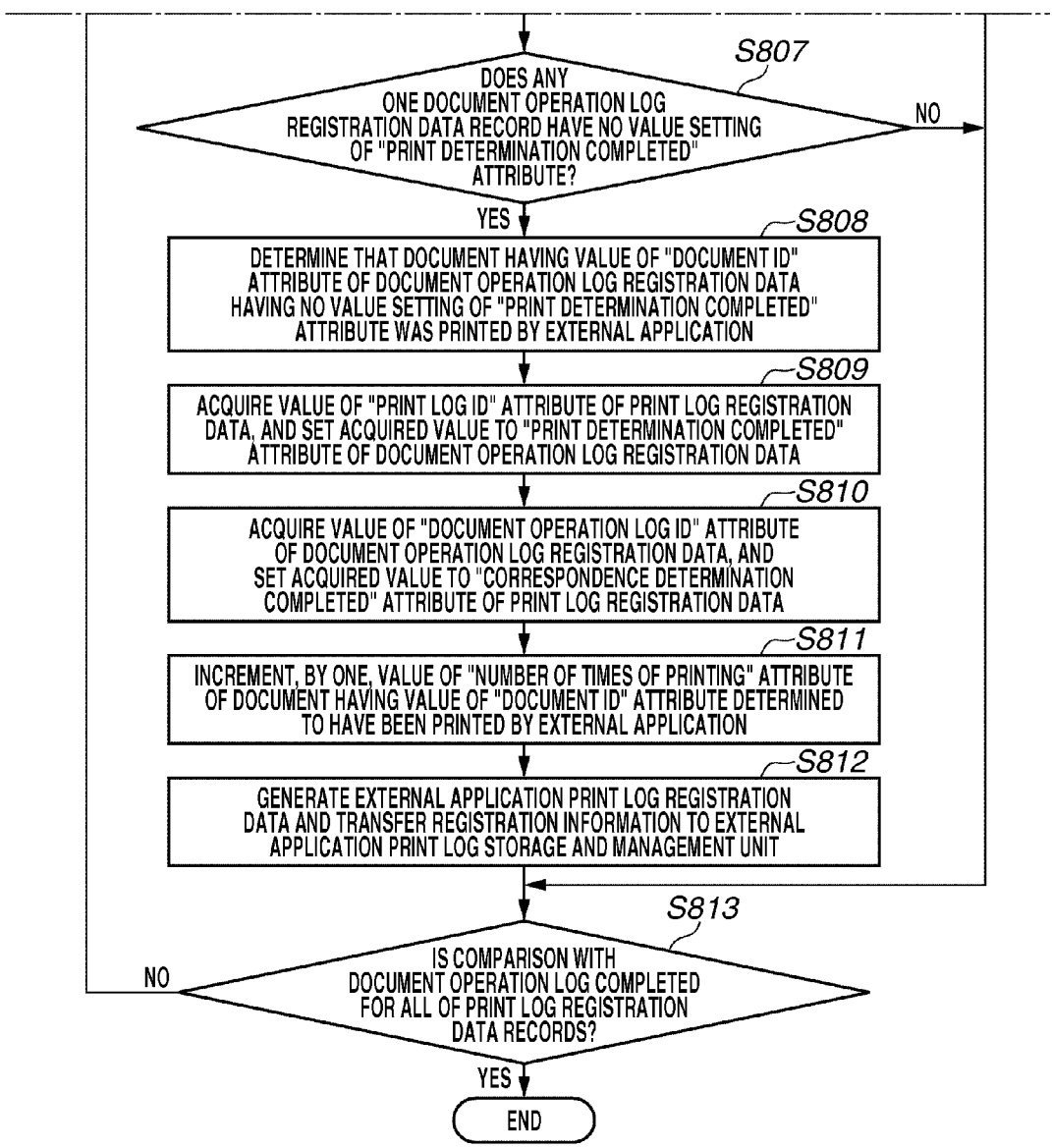

FIG. 8, which is composed of FIGS. 8A and 8B, is a flowchart illustrating printing determination processing for a document managed by the document management server application 301. The following describes processing for determining a document printed in a print operation with an external application out of documents managed within the document management server application 301, by comparing the document operation log 401 with the print log 501. Although, in the present exemplary embodiment, the flowchart illustrated in FIG. 8 is started at intervals of 15 minutes by the document management main control unit 302, the start timing is not limited thereto.

In step S801, the document management main control unit 302 acquires a new print log from a printer (the MFP device 103, etc.) identified based on information about the target printer for print log acquisition stored in the print log acquisition destination setting storage unit 309, and transfers the acquired print log to the print log storage and management unit 305.

In step S802, in order of registration, the document management main control unit 302 reads from the print log storage and management unit 305 each print log registration data records 521 to 527 of the print log 501 (see FIG. 5A) stored in step S801. Then, the document management main control unit 302 sequentially applies the processing in steps S803 to S813 to each print log registration data record.

In step S803, with respect to the print log registration data currently being processed, the document management main control unit 302 searches for document operation log registration data satisfying the following three conditions in the document operation log 401 (FIG. 4A) of the document operation log storage and management unit 304, and reads the searched document operation log registration data into the RAM 202.

(1) The value of the "OPERATION TYPE" attribute 407 is "OPEN" or "REGISTER NEW DOCUMENT." Alternatively, the value is an operation type equivalent to "OPEN" or "REGISTER NEW DOCUMENT."

(2) The value of the "OPERATION USER" attribute 406 is identical to the value of the "PRINT USER" attribute 505.

(3) The value of the "DATE AND TIME OF OPERATION" attribute 408 is earlier by up to a predetermined time period than the value of the "DATE AND TIME OF PRINT START" attribute 506.

In the above-described condition (3), the "predetermined time period" (hereinafter also referred to as time width) is desirably a time period since a document is opened or a new document is registered until it is printed. In consideration of work flows such as "OPEN document→EDIT→PRINT (with an external application)" and "CREATE NEW DOCUMENT→EDIT→REGISTER NEW DOCUMENT to the document management system→EDIT→PRINT→UPDATE registered document on document management system (with an external application)", the time width is presumed to be 12 hours or less for a general office worker. Therefore, the present exemplary embodiment uses as a search condition the value of the "DATE AND TIME OF OPERATION" attribute 408 up to 12 hours earlier than the value of the "DATE AND TIME OF PRINT START" attribute 506. The time width is not limited to 12 hours and may be set to any other value according to the work flow in each office.

In step S804, as a result of the search executed in step S803, the document management main control unit 302 determines whether at least one document operation log registration data record satisfying all of the above-described three conditions is read into the RAM 202. When at least one document operation log registration data record is read (YES in step S804), i.e., when at least one document operation log registration data record satisfying all of the above-described three conditions is found out of the document operation log registration data recorded in the document operation log 401, the processing proceeds to step S805. Otherwise, when none of document operation log registration data records is read (NO in step S804), the processing proceeds to step S813.

In step S805, by using the external-application-specific information in the external-application-specific information storage unit 307, the document management main control unit 302 compares the value of the "DOCUMENT NAME" attribute 405 of the document operation log registration data satisfying the search conditions (see step S803) with the value of the "JOB NAME" attribute 504 of the print log registration data currently being processed. Details on the comparison by using the information in the external-application-specific information storage unit 307 will be described below.

In step S806, the document management main control unit 302 determines whether there is at least one document operation log registration data record having identical or similar values to the print log registration data, as a result of the comparison in step S805. When there is at least one such document operation log registration data record (YES in step S806), the processing proceeds to step S807. Otherwise, when there is no document operation log registration data record (NO in step S806), the processing proceeds to step S813. The determination of identical or similar values will be described in detail below.

In step S807, the document management main control unit 302 confirms whether a certain value of the print log ID attribute is set to the "PRINT DETERMINATION COMPLETED" attribute 409 of each document operation log registration data record having identical or similar values to the print log registration data. When any one document operation log registration data record has no value setting of the "PRINT DETERMINATION COMPLETED" attribute 409 (YES in step S807), the processing proceeds to step S808. Otherwise, when a certain value is set to the "PRINT DETERMINATION COMPLETED" attribute 409 for all of document operation log registration data records having identical or similar values to the print log registration data (NO in step S807), the processing proceeds to step S813.

In step S808, the document management main control unit 302 determines that a document (in the document data storage and management unit 303) having the value of the "DOCUMENT ID" attribute 403 of the document operation log registration data having no value setting of the "PRINT DETERMINATION COMPLETED" attribute 409 was printed by an external application.

In step S809, the document management main control unit 302 acquires the value of the "PRINT LOG ID" attribute 502 of the print log registration data currently being processed, and sets the acquired value as the value of the "PRINT DETERMINATION COMPLETED" attribute 409 of the relevant document operation log registration data.

In step S810, the document management main control unit 302 acquires the value of the "DOCUMENT OPERATION LOG ID" attribute 402 of the relevant document operation log registration data, and sets the acquired value as the value of the "CORRESPONDENCE DETERMINATION COMPLETED" attribute 510 of the print log registration data currently being processed.

In step S811, the document management main control unit 302 instructs the document data storage and management unit 303 to increment by one the numerical value of the "NUMBER OF TIMES OF PRINTING" attribute of a document having the value of the "DOCUMENT ID" attribute 403 determined in step S808 to have been printed by an external application. A "NUMBER OF PRINT USERS" attribute may be used instead of the "NUMBER OF TIMES OF PRINTING" attribute. In this case, the document management main control unit 302 increments by one the numerical value of the "NUMBER OF PRINT USERS" attribute only when the document management main control unit 302 determines that a user printed the relevant document for the first time.

In step S812, the document management main control unit 302 generates external application print log registration data based on information about the relevant document operation log registration data and the print log registration data currently being processed, and transfers the relevant registration information to the external application print log storage and management unit 306. In this case, the document management main control unit 302 copies the values of the "DOCUMENT ID" attribute 403, the "DOCUMENT PATH" attribute 404, and the "DOCUMENT NAME" attribute 405 of the relevant document operation log registration data respectively to the values of the "DOCUMENT ID" attribute 603, the "DOCUMENT PATH" attribute 604, and the "DOCUMENT NAME" attribute 605 of the external application print log registration data to be generated. The document management main control unit 302 further copies the values of the "PRINT USER" attribute 505 and the "DATE AND TIME OF PRINT START" attribute 506 of the print log registration data currently being processed respectively to the values of the "PRINT USER" attribute 606 and the "DATE AND TIME OF PRINT START" attribute 607.

In step S813, the document management main control unit 302 determines whether the comparison with the document operation log 401 is completed for all of print log registration data records generated based on the print log newly acquired in step S801. When the comparison is not completed for any one print log registration data record (NO in step S813), the processing proceeds to step S802 to process the following print log registration data. When the comparison is completed for all of print log registration data records generated based on the newly acquired print log (YES in step S813), the processing exits this flowchart.

The document management main control unit 302 determines identical values in step S806, for example, when the "JOB NAME" attribute 504 of the print log registration data record 521 and the "DOCUMENT NAME" attribute 405 of the document operation log registration data record 424 have an identical character string value (for example, document 1.pdf).

The document management main control unit 302 determines similar values in step S806 based on the following two patterns.

A first pattern for determining similar values is, for example, a case of a value "Microsoft Word—FINAL DECISION SHEET A.docx" of the "JOB NAME" attribute 504 of the print log registration data record 525, and a value "FINAL DECISION SHEET A.docx" of the "DOCUMENT NAME" attribute 405 of the document operation log registration data record 425. Specifically, with the job name, an application-specific character string may be added before and after an original document name by an application which performed printing. For example, with the "JOB NAME" attribute 504 of the print log registration data record 525, a character string indicating an application name ("Microsoft Word—") is added by an application (Microsoft Word (registered trademark) in this case) presumed to have been used for printing. For example, with the value "Microsoft PowerPoint—DOCUMENT 3.ppt [COMPATIBLE MODE]" of the "JOB NAME" attribute 504 of the print log registration data record 523, a character string indicating an application name ("Microsoft PowerPoint—") and a character string indicating a mode ("[[COMPATIBLE MODE]") when the document was opened are added by an application (Microsoft PowerPoint (registered trademark) in this case) presumed to have been used for printing. Therefore, the document management server application 301 stores in the external-application-specific information storage unit 307 characteristics specific to each of these external applications outside the document management system required for comparing the job name with the document name. In step S805, after deleting a character string presumed to have been added by an application from the value of the "JOB NAME" attribute 504 of the print log registration data currently being processed, by using the information in the external-application-specific information storage unit 307, the document management main control unit 302 performs the comparison. In step S806, the document management main control unit 302 determines whether the value of the "JOB NAME" attribute 504 of the print log registration data coincides with the value of the "DOCUMENT NAME" attribute 405 of the document operation log registration data. In this case, the document management main control unit 302 determines that matched values are similar values.

A second pattern for determining similar values is, for example, a case of a value "123456789012345678901234567890012" of the "JOB NAME" attribute 504 of the print log registration data record 526, and a value "1234567890123456789012345678901234545.txt" of the "DOCUMENT NAME" attribute 405 of the document operation log registration data record 421. Some printer drivers which generate a print job truncate to 32 bytes the print job name transferred from an application. Therefore, when a 32-byte value is set as the value of the "JOB NAME" attribute 504 of the print log registration data, the document management main control unit 302 compares this value with the value of the "DOCUMENT NAME" attribute 405 of the document operation log registration data on a prefix search basis. Specifically, when the first 32 bytes of both values are matched, the document management main control unit 302 determines that these values are similar values. The first pattern is applied also to a case where a 32-byte value is set. Similar to the first pattern, after deleting a character string presumed to have been added by an application from the value of the "JOB NAME" attribute 504 of the print log registration data currently being processed, the document management main control unit 302 compares the remaining character string of the job name with the value of the "DOCUMENT NAME" attribute 405 of the document operation log registration data on a prefix search basis. Specifically, when the first 32 bytes of both values are matched, the document management main control unit 302 determines that these values are similar values.

Figure 7:
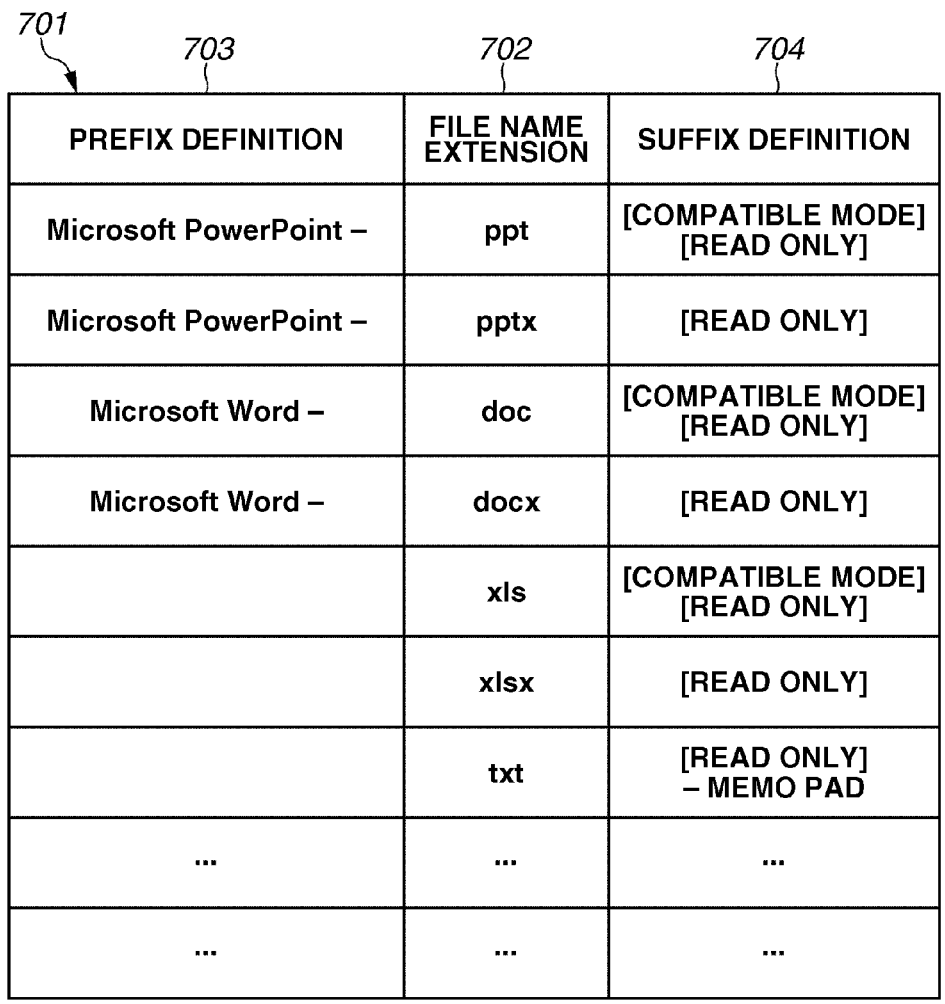
FIG. 7 illustrates an external-application-specific information table stored in an external-application-specific information storage unit.

FIG. 7 illustrates an external-application-specific information table 701 stored in the external-application-specific information storage unit 307. The external-application-specific information table 701 is stored in the hard disk 210 and managed. The external-application-specific information table 701 includes a file name extension 702, a prefix definition 703, and a suffix definition 704 of external applications. The prefix definition 703 indicates that an external application which appends the file name extension 702 to the print job name will append the relevant character string to the top of the file name. The suffix definition 704 indicates that an external application may append the relevant character string to the end of the print job name to which the file name extension 702 has been appended. The value of the suffix definition 704 does not need to have the entire character string of the suffix, and may have a part thereof. For example, when a character string including a space and a bracket ("_[") is set as the suffix definition 704, it indicates that any character string starting with "_[" may be appended to the end of the character string of the file name extension 702 in the print job name.

FIG. 4B illustrates an example document operation log after execution of the above-described flowchart in FIG. 8 and the flowcharts in FIGS. 9 and 11 (described below).

FIG. 5B illustrates an example print log after execution of the above-described flowchart illustrated in FIG. 8 and the flowcharts in FIGS. 9 and 11 (described below).

In the flowchart illustrated in FIG. 8, a value is set to the "PRINT DETERMINATION COMPLETED" attribute 409 of the document operation log registration data records 421 and 423 to 425 (see FIG. 4B) and to the "CORRESPONDENCE DETERMINATION COMPLETED" attribute 510 of the print log registration data records 521, 523, and 525 to 526 (see FIG. 5B). Further, in the flowchart illustrated in FIG. 8, external application print log registration data records 621 to 624 (see FIG. 6) are generated.

Figure 9B:
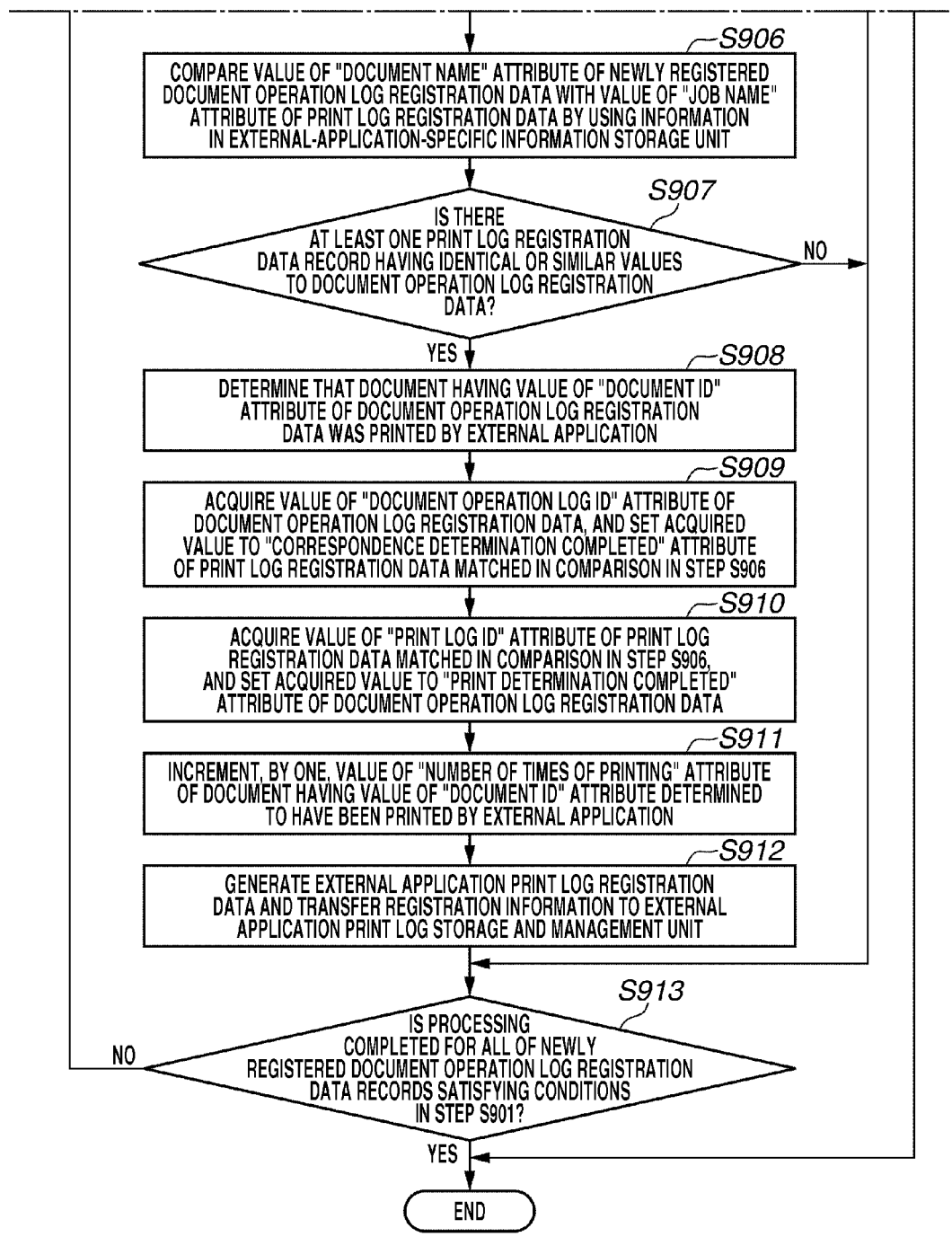
FIG. 9, which is composed of FIGS. 9A and 9B, is a flowchart illustrating printing determination processing for a document printed before being managed by the document management server application.

FIG. 9, which is composed of FIGS. 9A and 9B, is a flowchart illustrating printing determination processing for a document printed before being managed by the document management server application 301. Processing performed by the document management server application 301 to determine a document printed before being managed by the document management server application 301 will be described below.

After completion of execution of the flowchart illustrated in FIG. 8, the flowchart illustrated in FIG. 9 is subsequently executed by the document management main control unit 302. However, the timing of starting execution is not limited thereto.

In step S901, the document management main control unit 302 searches for document operation log registration data satisfying the following three conditions in the document operation log 401 of the document operation log storage and management unit 304, and reads the searched document operation log registration data into the RAM 202.

(1) The value of the "OPERATION TYPE" attribute 407 is "REGISTER NEW DOCUMENT." Alternatively, the value is an operation type equivalent to "REGISTER NEW DOCUMENT."

(2) The "PRINT DETERMINATION COMPLETED" attribute 409 has no value setting.

(3) The value of the "DATE AND TIME OF OPERATION" attribute 408 is a time period between the present time and the time of starting last execution of the flowchart illustrated in FIG. 9. The time width is not limited thereto.

In step S902, as a result of the search executed in step S901, the document management main control unit 302 determines whether at least one document operation log registration data record satisfying all of the above-described three conditions is read into the RAM 202. When at least one document operation log registration data record is read (YES in step S902), the processing proceeds to step S903. Otherwise, when none of document operation log registration data records is read (NO in step S902), the processing exits this flowchart.

In step S903, in order of registration in the document operation log storage and management unit 304, the document management main control unit 302 applies the processing in steps S904 to S913 to each of newly registered document operation log registration data records satisfying the search conditions read into the RAM 202 in step S901.

In step S904, the document management main control unit 302 searches for print log registration data satisfying the following three conditions in the print log of the print log storage and management unit 305, and reads the searched data into the RAM 202.

(1) The value of the "PRINT USER" attribute 505 is identical to the value of the "OPERATION USER" attribute 406 of the newly registered document operation log registration data currently being processed.

(2) The "CORRESPONDENCE DETERMINATION COMPLETED" attribute 510 has no value setting.

(3) The value of the "DATE AND TIME OF PRINT START" attribute 506 is earlier by a predetermined time period than the value of the "DATE AND TIME OF OPERATION" attribute 408 of the newly registered document operation log registration data currently being processed. The predetermined time period (time width) is desirably a time period since a document is printed until it is newly registered. In consideration of work flows such as "CREATE NEW DOCUMENT→EDIT→PRINT→REGISTER NEW DOCUMENT to the document management system (with an external application)", the time width is presumed to be 12 hours or less for a general office worker. Therefore, the present exemplary embodiment uses as a specific search condition the value of the "DATE AND TIME OF PRINT START" attribute 506 which is 12 hours earlier than the present time. However, the time width is not limited thereto.

In step S905, as a result of the search executed in step S904, the document management main control unit 302 determines whether at least one print log registration data record satisfying the above-described three conditions is read into the RAM 202. When at least one print log registration data record is read (YES in step S905), the processing proceeds to step S906. Otherwise, when none of print log registration data records is read (NO in step S905), the processing proceeds to step S913.

In step S906, by using the external-application-specific information 701 in the external-application-specific information storage unit 307, the document management main control unit 302 compares the value of the "DOCUMENT NAME" attribute 405 of the newly registered document operation log registration data currently being processed with the value of the "JOB NAME" attribute 504 of the print log registration data satisfying the search conditions (see step S905). Details on the comparison by using the information in the external-application-specific information storage unit 307 are as described above.

In step S907, the document management main control unit 302 determines whether there is at least one print log registration data record satisfying the search conditions (see step S905) having identical or similar values to the newly registered document operation log registration data currently being processed, as a result of the comparison in step S906. When there is at least one such print log registration data record (YES in step S907), the processing proceeds to step S908. Otherwise, when there is no such print log registration data record (NO in step S907), the processing proceeds to step S913. Details on the determination of identical or similar values are as described above.

In step S908, the document management main control unit 302 determines that a document (in the document data storage and management unit 303) having the value of the "DOCUMENT ID" attribute 403 of the newly registered document operation log registration data currently being processed was printed by an external application.

In step S909, the document management main control unit 302 acquires the value of the "DOCUMENT OPERATION LOG ID" attribute 402 of the document operation log registration data currently being processed, and sets the acquired value as the value of the "CORRESPONDENCE DETERMINATION COMPLETED" attribute 510 of the print log registration data matched in the comparison in step S906.

In step S910, the document management main control unit 302 acquires the value of the "PRINT LOG ID" attribute 502 of the print log registration data matched in the comparison in step S906, and sets the acquired value as the value of the "PRINT DETERMINATION COMPLETED" attribute 409 of the document operation log registration data currently being processed. When there is a plurality of print log registration data records matched in the comparison in step S906, the document management main control unit 302 acquires the values of the "PRINT DETERMINATION COMPLETED" attribute 409 from the plurality of the relevant print log registration data records, delimits with a comma the values of the "PRINT LOG ID" attribute 502 of the acquired print log registration data records, and sets the delimited values as the value the "PRINT DETERMINATION COMPLETED" attribute 409. A case where there is a plurality of print log registration data records matched in the comparison in step S906 is equivalent to a case where the same document was printed a plurality of number of times.

In step S911, the document management main control unit 302 instructs the document data storage and management unit 303 to increment by one the numerical value of the "NUMBER OF TIMES OF PRINTING" attribute of a document having the value of the "DOCUMENT ID" attribute 403 determined in step S908 to have been printed by an external application. A "NUMBER OF PRINT USERS" attribute may be used instead of the "NUMBER OF TIMES OF PRINTING" attribute. In this case, the document management main control unit 302 increments by one the numerical value of the "NUMBER OF PRINT USERS" attribute only when the document management main control unit 302 determines that a user printed the relevant document for the first time.

In step S912, the document management main control unit 302 generates external application print log registration data based on the information about the print log registration data matched in the comparison with the document operation log registration data currently being processed in step S906, and transfers the relevant registration information to the external application print log storage and management unit 306. When there is a plurality of print log registration data records matched in the comparison in step S906, the document management main control unit 302 generates external application print log registration data corresponding to each of the matched print log registration data records. Details on the external application print log registration data generated by the document management main control unit 302 are as described above.

In step S913, the document management main control unit 302 determines whether the processing in steps S904 to S912 is completed for all of newly registered document operation log registration data records satisfying the search conditions (see step S901). When the processing in steps S904 to S912 is not completed for any one document operation log registration data record (NO in step S913), the processing proceeds to step S903. When the processing in steps S904 to S912 is completed for all of newly registered document operation log registration data records satisfying the search conditions (see step S901) (YES in step S913), the processing exits this flowchart.

In the above-described flowchart illustrated in FIG. 9, a value is set to the "PRINT DETERMINATION COMPLETED" attribute 409 of the document operation log registration 426 (see FIG. 4B) and to the "CORRESPONDENCE DETERMINATION COMPLETED" attribute 510 of the print log registration 522 (see FIG. 5B). Likewise, in the above-described flowchart illustrated in FIG. 9, an external application print log registration data record 626 (see FIG. 6) is generated.

An actual use of the "NUMBER OF TIMES OF PRINTING" or "NUMBER OF PRINT USERS" attribute of a document will be described below. As described below, the "NUMBER OF TIMES OF PRINTING" or "NUMBER OF PRINT USERS" attribute of a document is used as a criterion of determination at the time of document recommendation.

FIG. 10 illustrates example display of the UI unit 313 of the document management client application 311. The display includes a main window 1000 and a navigation pane 1001.

The navigation pane 1001 displays libraries registered by applications and folders arranged under the libraries. In the navigation pane 1001, the current location can be moved by selecting a library or a folder arranged under the libraries. Referring to FIG. 10, libraries 1011 to 1013 and folders 1014 to 1015 are displayed, and the library 1011 is selected as the current location. A library refers to a unit of storage for achieving document management. Libraries used by the document management client application 311 are classified into two different types in terms of data storage location.

A first type library is a local library with which a data storage area is generated in the local external memory 210 of a PC which executes the document management client application 311. A local library is managed by the document management client application 311. With first type libraries, a system can be configured only with the document management client application 311 without using the document management server application 301. Referring to FIG. 10, the library 1013 is a local library.

A second type library is a shared library with which document management is entrusted to a document management service provided by the document management server application 301. With second type libraries, the client main control unit 312 transfers to the document management server application 301 a document operation request received from the UI unit 313, receives the result of document operation from the document management server application 301, and transfers the result to the UI unit 313. With second type libraries, a system can be configured in a simple way, i.e., the client main control unit 312 only transfers and receives data to/from the document management service of the document management server application 301. Referring to FIG. 10, the libraries 1011 and 1012 are shared libraries.

A file list pane 1002 displays documents and folders stored in a selected location (library or folder) in the navigation pane 1001. Referring to FIG. 10, the navigation pane 1001 displays two folders 1014 and 1015 stored in the shared library 1011 currently selected.

A mouse pointer 1031, controlled by the keyboard controller 204, operates libraries, documents, and folders in the UI unit 313 of the document management client application 311 in response to a user operation instruction.

A panel 1007 shows and hides each pane. The panel 1007 includes a button 1008 for showing and hiding the navigation pane 1001 and a button 1009 for showing and hiding a recommendation pane 1003.

When a shared library is selected in the navigation pane 1001, the recommendation pane 1003 displays documents frequently browsed or printed by a user or group in the library, as recommended documents. When a document is selected in the file list pane 1002, the recommendation pane 1003 displays documents related to the selected document as recommended documents. For example, documents simultaneously used with the selected document in the past are displayed. Further, when a folder is selected in the navigation pane 1001 or the file list pane 1002, the recommendation pane 1003 displays documents frequently browsed or printed by a user and a group under the selected folder, as recommended documents. Referring to FIG. 10, recommended documents 1021 and 1022 related to the library 1011 selected in the navigation pane 1001 are displayed. Character strings 1024 and 1023 indicate a reason (reason for recommendation) why the recommended documents 1021 and 1022 are recommended, respectively.

The document management main control unit 302 selects recommended documents according to a document operation request by the document management client application 311. For example, when "a list of the library 1011" is transmitted as a document operation request via the server communication unit 308, the document management main control unit 302 acquires from the document data storage and management unit 303 a list of folders and documents stored directly under the library 1011, and returns the acquired list to the document management client application 311. Further, the document management main control unit 302 returns recommended documents related to the library 1011 to the document management client application 311 together with the reasons for recommendation. The document management main control unit 302 acquires from the document data storage and management unit 303 documents having a large value of the "NUMBER OF TIMES OF PRINTING" or "NUMBER OF PRINT USERS" attribute out of documents belonging to the library 1011, as recommended documents related to the library 1011, and selects two documents having first and second largest values accessible by the user who operated the documents.

Selecting recommended documents by the document management server application 301 and displaying them by the document management client application 311 in this way will be referred to as document recommendation.

Document recommendation may be determined based not only on the values of the "NUMBER OF TIMES OF PRINTING" and "NUMBER OF PRINT USERS" attributes of documents but also on the number of times of viewing and simultaneous use of documents obtained by analyzing the document operation log stored in the document operation log storage and management unit 304.

In the flowchart for performing printing determination for a document managed by the document management server application 301 (see FIG. 8), when there is a plurality of document operation log registration data records having no value setting of the "PRINT DETERMINATION COMPLETED" attribute 409 in step S807, all of these document operation log registration data records are subjected to the processing in step S808 and subsequent steps.

Specifically, in step S809, the value of the "PRINT LOG ID" attribute 502 of the print log registration data currently being processed is set to the value of the "PRINT DETERMINATION COMPLETED" attribute 409 of all of these document operation log registration data records.

Further, in step S810, the value of the "DOCUMENT OPERATION LOG ID" attribute 402 of all of document operation log registration data records is set as the value of the "CORRESPONDENCE DETERMINATION COMPLETED" attribute 510 of the print log registration data currently being processed.

Basically, it is desirable to determine one document operation log registration data record for the print log registration data currently being processed. However, if the value of the "DOCUMENT ID" attribute 403 of these document operation log registration data records is identical, it can be determined that an identical user opened an identical document managed by the document management server application 301 a plurality of number of times before printing or that an identical user registered a new document and opened it at least once before printing. In this case, it is not necessary to determine one document operation log registration data record for the print log registration data currently being processed, and the processing of the flowchart (see FIG. 8) is sufficient.

When there is found one document operation log registration data record determined to have identical values to the print log registration data in step S806 before step S807, the processing in step S807 and subsequent steps may be applied only to the document operation log registration data determined to have identical values even if any other document operation log registration data is determined to have similar values to the print log registration data.

However, when a plurality of document operation log registration data records determined to have similar values remains after the processing in step S807 and the values of the "DOCUMENT ID" attribute 403 of these document operation log registration data records are different, any one of the relevant documents is an actually printed document corresponding to the print log registration data currently being processed. In this case, another method for identifying an actually printed document out of documents having different values of the "DOCUMENT ID" attributes 403 is required. This method will be described below with reference to FIG. 11.

Figure 11:
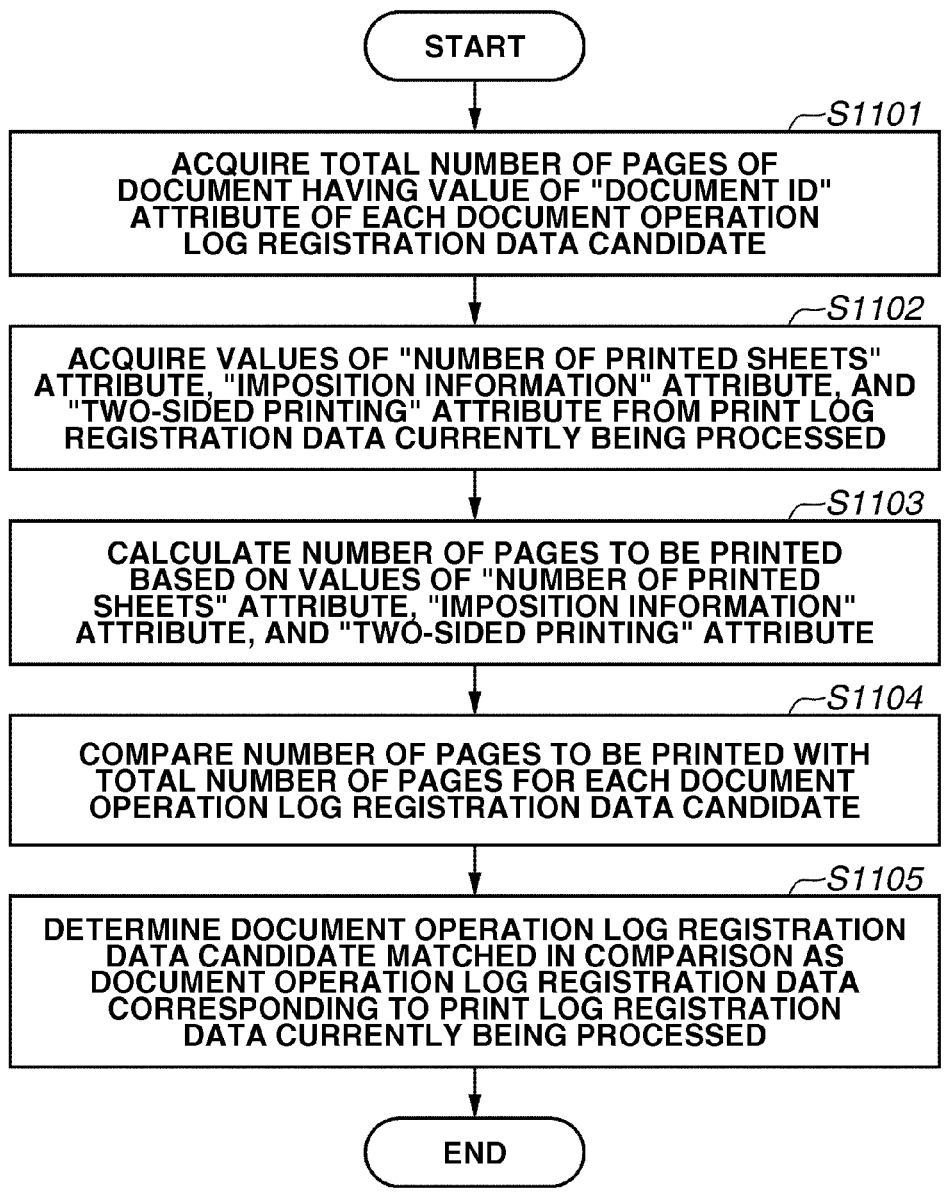
FIG. 11 is a flowchart illustrating processing for identifying a printed document through the comparison of the number of pages.

FIG. 11 is a flowchart illustrating processing for identifying a printed document through the comparison of the number of pages. The flowchart illustrated in FIG. 11 is started by the document management main control unit 302 when there is a plurality of document operation log registration data records having no value setting of the "PRINT DETERMINATION COMPLETED" attribute 409 corresponding to the print log registration data currently being processed in step S807, and the values of the "DOCUMENT ID" attribute 403 of these document operation log registration data records are different. Upon completion of processing, the processing proceeds to step S808. However, the timing of starting execution and the processing after execution are not limited thereto.

In step S1101, the document management main control unit 302 acquires from the document data storage and management unit 303 the total number of pages of documents having the value of the "DOCUMENT ID" attribute 403 of the document operation log registration data. In the case of Microsoft Office (registered trademark) documents, for example, the document data storage and management unit 303 can acquire the total number of pages from the actual document by using the technique of Microsoft Office Primary Interop Assemblies offered by Microsoft Corp. The acquired information is not limited to the number of pages, and may be information equivalent to the number of pages. In the case of documents of a presentation application such as Microsoft PowerPoint (registered trademark), the number of slides is used as information equivalent to the number of pages. In this case, the total number of the slides is used as the total number of pages.

In step S1102, the document management main control unit 302 acquires the values of the "NUMBER OF PRINTED SHEETS" attribute 507, the "IMPOSITION INFORMATION" attribute 508, and the "TWO-SIDED PRINTING" attribute 509 based on the print log registration data currently being processed.

In step S1103, based on the values of the "NUMBER OF PRINTED SHEETS" attribute 507, the "IMPOSITION INFORMATION" attribute 508, and the "TWO-SIDED PRINTING" attribute 509 acquired in step S1102, the document management main control unit 302 calculates the number of pages to be printed for a print document on which an actual print job of the print log registration data is based. The following simple multiplication formula is used in the calculation.

(NUMBER OF PRINTED SHEETS)×(IMPOSITION INFORMATION)×(TWO-SIDED PRINTING)= (Number of pages to be printed)

where the number of sheets printed is assigned the "NUMBER OF PRINTED SHEETS" attribute 507 as it is, and the values of the imposition information and two-sided printing are assigned the following values.

When the value of the "IMPOSITION INFORMATION" attribute 508 is "2in1", the value of the imposition information is assigned 2, and the above-described formula is:

(NUMBER OF PRINTED SHEETS)×2×(TWO-SIDED PRINTING)=(Number of pages to be printed)

Likewise, when the value of the "IMPOSITION INFORMATION" attribute 508 is "4in1", the value of the imposition information is assigned 4, and the above-described formula is:

(NUMBER OF PRINTED SHEETS)×4×(TWO-SIDED PRINTING)=(Number of pages to be printed)

When the value of "TWO-SIDED PRINTING" attribute 509 is "YES", the value of the two-sided printing is assigned 2, and the above-described formula is:

(NUMBER OF PRINTED SHEETS)×(IMPOSITION INFORMATION)×2=(Number of pages to be printed)

Likewise, when the value of "TWO-SIDED PRINTING" attribute 509 has no value or "NO", the value of the imposition information is assigned 1, and the above-described formula is:

(NUMBER OF PRINTED SHEETS)×(IMPOSITION INFORMATION)×1=(Number of pages to be printed)

The value of the number of pages to be printed calculated by the above-described formula represents the number of pages specified as a print range when an application prints a document on a PC. Specifically, the value of the number of pages to be printed equals the total number of pages in the document or the number of pages in a page range therein.

Although, in the above example, the values of the "NUMBER OF PRINTED SHEETS" attribute 507, the "IMPOSITION INFORMATION" attribute 508, and "TWO-SIDED PRINTING" attribute 509 are used, it is also possible to arrange the above-described formulas to use any parameter enabling calculating the number of pages to be printed on which a print job is based.

In step S1104, the document management main control unit 302 compares the number of pages to be printed calculated in step S1103 with the total number of pages for each document having the value of the "DOCUMENT ID" attribute 403 of each document operation log registration data record acquired in step S1101. The comparison is performed by using the following comparative formula.

(Total number of pages of document)≥(Number of pages to be printed)

In step S1105, as a result of the comparison in step S1104, the document management main control unit 302 determines document operation log registration data having the value of the "DOCUMENT ID" attribute 403 equal to the document ID of a document having the total number of pages equal to or larger than the number of pages to be printed, as the document operation log registration data corresponding to the print log registration data currently being processed. Then, the processing exits this flowchart.

In the above-described flowcharts illustrated in FIGS. 8 and 11, a value is set to the "PRINT DETERMINATION COMPLETED" attribute 409 of the document operation log registration data 427 (see FIG. 4B) and to the "CORRESPONDENCE DETERMINATION COMPLETED" attribute 510 of the print log registration data 527 (see FIG. 5B). Likewise, in the above-described flowcharts illustrated in FIGS. 8 and 11, the external application print log registration data 625 (see FIG. 6) is generated.

With the above-described processing, when there is a plurality of document operation log registration data candidates corresponding the print log registration data, comparing the total number of pages acquired based on documents corresponding to the document operation log of these data candidates with the number of pages to be printed calculated based on the print log registration data enables narrowing document operation log registration data candidates.

Referring to FIG. 5B, after execution of the above-described flowcharts in FIGS. 8, 9, and 11, no value is set to the "CORRESPONDENCE DETERMINATION COMPLETED" attribute 510 of the print log registration data record 524, and the corresponding external application print log registration data is not generated in the external application print log 601 (see FIG. 6). This is because document operation log registration data corresponding to the print log registration data does not exist in the document operation log 401.

Therefore, it is assumed that this print log registration data is not a print log generated when a document managed by the document management server application 301 was printed but a print log generated when a file on a file system of the client PC 102 was printed. Since the value of the "JOB NAME" attribute 504 of the print log registration data record 524 is identical to the value of the "JOB NAME" attribute 504 of the print log registration data record 521, the name of the printed document or file is assumed to be "DOCUMENT 1.PDF." Specifically, it is assumed that at least one document or file named "DOCUMENT 1. PDF" exists on each of the document management server PC 101 and the client PC 102 within the document management system illustrated in FIG. 1.

Specifically, according to the present exemplary embodiment, even if a document having the same name exists in each of the document data storage and management unit 303 (document database (DB)) and the hard disk 210 of the client PC 102 (local file system), it is possible to determine, based on the log, that the document in the document DB was printed.

Further, according to the present exemplary embodiment, determining a job name similar to a document name enables determining whether a document was printed, even if a job name recorded in the print log is not exactly identical to a document name of a document managed by the document management system.

In a second exemplary embodiment of the present invention, a plurality of searches is executed under different comparison conditions to perform printing determination. This enables acquiring a similar effect to that in the first exemplary embodiment for a similar problem to that in the first exemplary embodiment. The system configuration, hardware configuration, and software configuration are similar to those in the first exemplary embodiment, and duplicated descriptions will be omitted.

Figure 12:
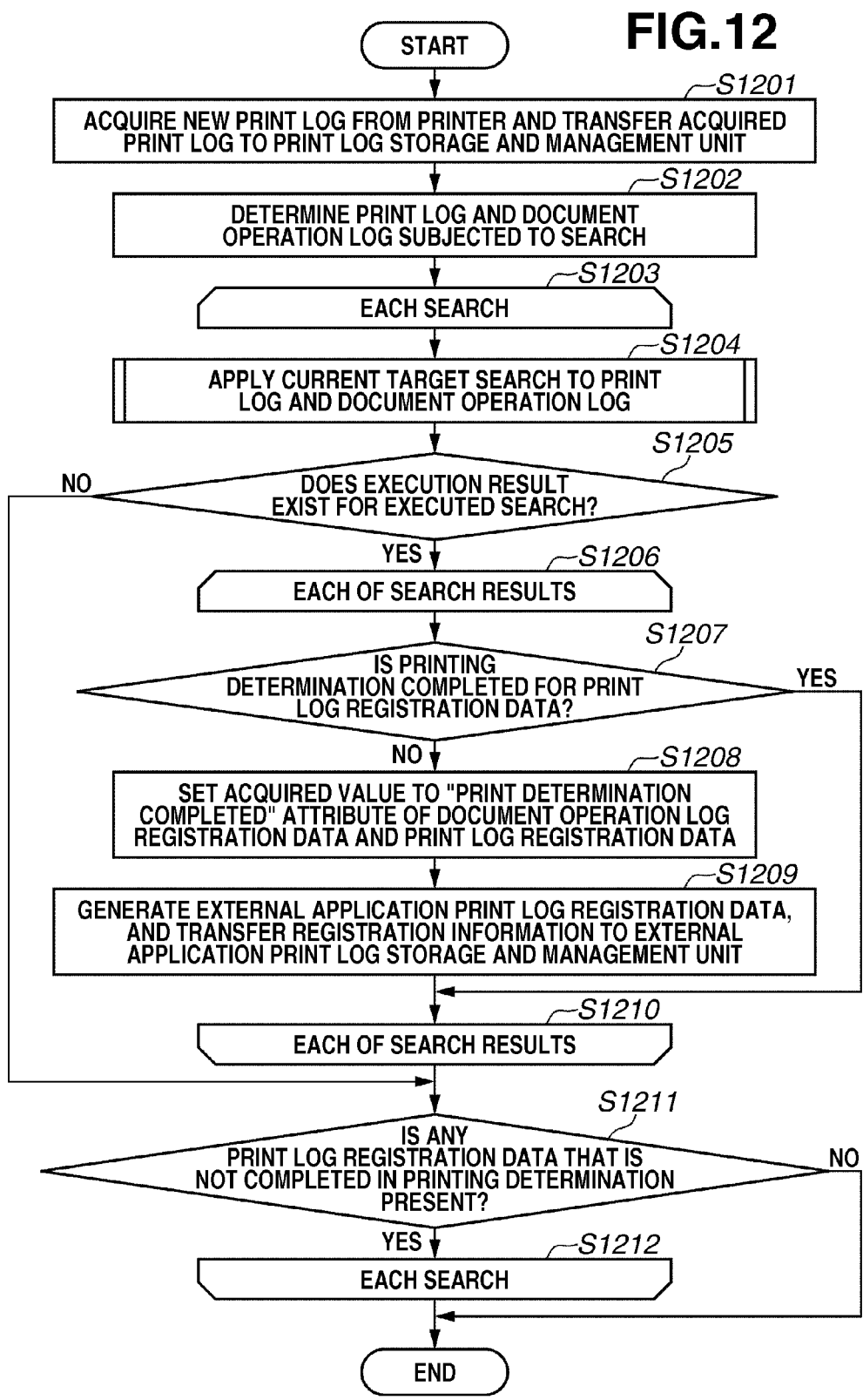
FIG. 12 is a flowchart illustrating printing determination processing for a document through execution of a plurality of searches under different comparison conditions according to a second exemplary embodiment of the present invention.

Processing in the second exemplary embodiment will be described below. FIG. 12 is a flowchart illustrating processing for applying a plurality of searches under different comparison conditions to the print log 451 and the document operation log 401 to perform printing determination. In the present exemplary embodiment, a plurality of searches (search 1, search 2, search 3, and search 4) is applied to search for combinations of the print log registration data and the document operation log registration data related to printed documents managed by the document management server. Processing of each search will be described in detail below.

In step S1201, similar to step S801, based on the information about the target printer for print log acquisition stored in the print log acquisition destination setting storage unit 309, the document management main control unit 302 acquires a new print log from a printer such as the MFP device 103, and transfers the acquired print log to the print log storage and management unit 305.

In step S1202, the document management main control unit 302 determines the print log and the document operation log subjected to the search processing. The print log acquired in step S1201 is subjected to the search processing. The document operation log processed by the processing of the flowchart in FIG. 12 and stored in the document operation log storage and management unit 304 is subjected to the search processing.

In step S1203, the document management main control unit 302 executes the processing in steps S1204 to S1212 in order of search 1, search 2, search 3, and search 4.

In step S1204, the document management main control unit 302 applies the current target search to the print log and the document operation log recorded in the document operation log storage and management unit 304.

To execute search 1, the processing proceeds to step S1301. To execute search 2, the processing proceeds to step S1401. To execute search 3, the processing proceeds to step S1601. To execute search 4, the processing proceeds to step S1701.

In step S1205, the document management main control unit 302 determines whether an execution result exists for the search executed in step S1204. When the execution result exists (YES in step S1205), the processing proceeds to step S1206. Otherwise, when no execution result exists (NO in step S1205), the processing proceeds to step S1211.

In step S1206, the document management main control unit 302 applies the processing in steps S1207 to S1210 to the result of each search executed in step S1204.

In step S1207, the document management main control unit 302 reads the document operation log registration data and the print log registration data based on the result of the current target search specified in step S1206, and confirms whether a certain value of the "DOCUMENT OPERATION LOG ID" attribute 402 is set as the value of the "CORRESPONDENCE DETERMINATION COMPLETED" attribute 510 of the print log registration data.

If no value is set in the "CORRESPONDENCE DETERMINATION COMPLETED" attribute 510 of the print log registration data (NO in step S1207), the document management main control unit 302 determines that print registration is not completed, and the processing proceeds to step S1208. If a certain value is set in the "CORRESPONDENCE DETERMINATION COMPLETED" attribute 510 of the print log registration data (YES in step S1207), the document management main control unit 302 determines that print registration is completed, and the processing proceeds to step S1210.

In step S1208, similar to step S809, the document management main control unit 302 acquires the value of the "PRINT LOG ID" attribute 502 of the print log registration data read in step S1207, and sets the acquired value as the value of the "PRINT DETERMINATION COMPLETED" attribute 409 of the document operation log registration data read in step S1207. Similar to step S810, the document management main control unit 302 acquires the value of the "DOCUMENT OPERATION LOG ID" attribute 402 of the document operation log registration data read in step S1207, and sets the acquired value as the value of the "CORRESPONDENCE DETERMINATION COMPLETED" attribute 510 of the print log registration data read in step S1207.

In step S1209, the document management main control unit 302 determines that the combination of the document operation log registration data and the print log registration data read in step S1207 as a log of a document managed by the document management server when it was printed. Then, similar to step S812, the document management main control unit 302 generates external application print log registration data, and transfers the relevant registration information to the external application print log storage and management unit 306.

In step S1210, when processing is not completed for any search result subjected to the processing in step S1206, the processing returns to step S1206 to process the following search result. Otherwise, when processing is completed for all search results, the processing proceeds to step 1211.

In step S1211, the document management main control unit 302 determines whether printing determination is not completed for any print log registration data acquired in step S1201. When printing determination is not completed for any one print log registration data record (YES in step S1211), the processing proceeds to step S1212. Otherwise, when printing determination is completed for all of print log registration data records (NO in step S1211), the processing exits this flowchart.

In step S1212, the document management main control unit 302 determines whether processing is completed for all of the four searches (search 1, search 2, search 3, and search 4). When processing is completed for all of the four searches, the processing exits this flowchart. Otherwise, when processing is not completed for any one search, the processing returns to step S1203 to execute the following search.

Processing of search 1, search 2, search 3, and search 4 will be described in detail below. In any search, the document management main control unit 302 sets four comparison conditions for the user information, operation date and time information, operation type information, and document information. In the present exemplary embodiment, any search will be described on the premise that three comparison conditions for the user information, operation date and time information, and operation type information have identical settings.

Figure 13:
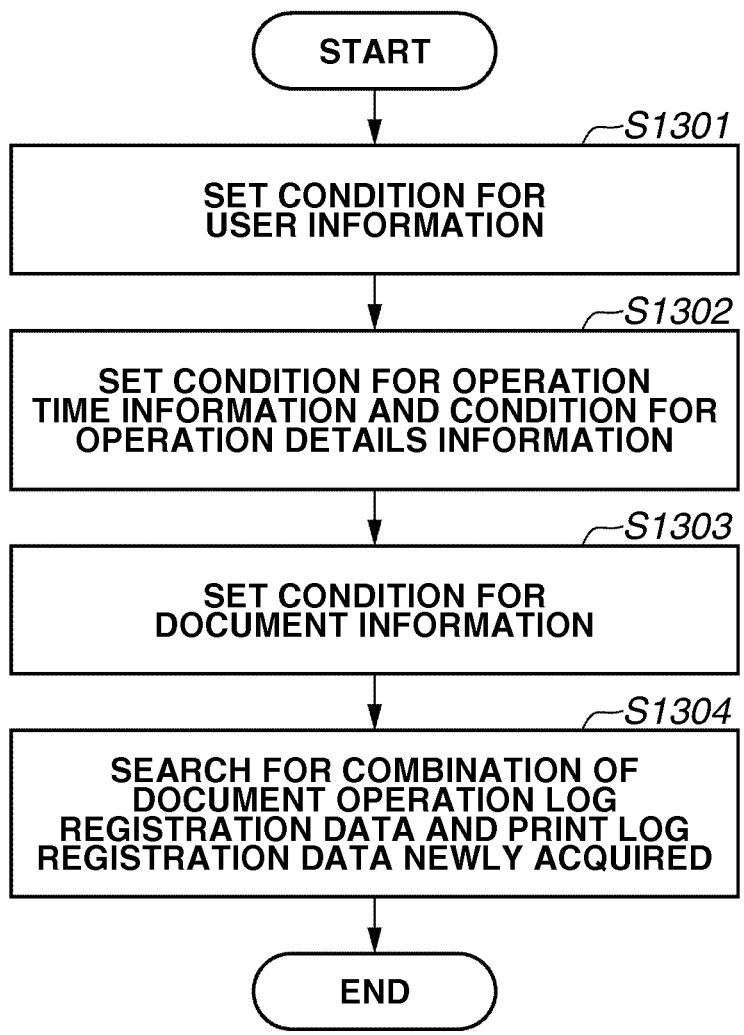
FIG. 13 is a flowchart illustrating processing of search 1 according to the second exemplary embodiment.

In search 1, the document management main control unit 302 determines a document with which the information of the "DOCUMENT NAME" is recorded as the value of the "JOB NAME" attribute 504 of the print log registration data, as a result of printing. Processing of search 1 will be described below with reference to FIG. 13.

In step S1301, the document management main control unit 302 sets the following condition as a comparison condition for the user information.

The value of the "PRINT USER" attribute 505 of the print log registration data is identical to the value of the "OPERATION USER" attribute 406 of the document operation log registration data.

In step S1302, the document management main control unit 302 sets the following condition (A) or (B) as a comparison condition for the operation date and time information and a comparison condition for the operation type information. Similar to steps S803 and S904, descriptions will be made on the premise that a time difference between the value of the "DATE AND TIME OF PRINT START" attribute 506 and the value of the "DATE AND TIME OF OPERATION" attribute 408 is 12 hours or less.

(A) The value of the "DATE AND TIME OF OPERATION" attribute 408 of the document operation log registration data is up to 12 hours earlier than the value of the "DATE AND TIME OF PRINT START" attribute 506 of the print log registration data, and the value of the "OPERATION TYPE" attribute 407 is "OPEN."

(B) The value of the "DATE AND TIME OF OPERATION" attribute 408 of the document operation log registration data is up to 12 hours later than the value of the "DATE AND TIME OF PRINT START" attribute 506 of the print log registration data, and the value of the "OPERATION TYPE" attribute 407 is "REGISTER NEW DOCUMENT."

In step S1303, the document management main control unit 302 sets the following condition as a comparison condition for document information.

The value of the "JOB NAME" attribute 504 of the print log registration data is exactly identical to the value of the "DOCUMENT NAME" attribute 405 of the document operation log registration data.

In step S1304, the document management main control unit 302 searches for a combination of the document operation log registration data and the print log registration data satisfying all of the search conditions respectively set in steps S1301 to S1303, in the document operation log and the print log determined in step S1202.

For example, as a result of search 1 applied to the print log registration data records 521 to 527 of the print log 501 and the document operation log registration data records 421 to 430 of the document operation log 401, "the print log registration data record 521 and the document operation log registration data record 424" and "the print log registration data record 522 and the document operation log registration data record 426" are acquired as combinations of the print log registration data and the document operation log registration data related to printed documents managed by the document management server.

Upon completion of processing of search 1, the processing proceeds to step S1206.

Figure 14:
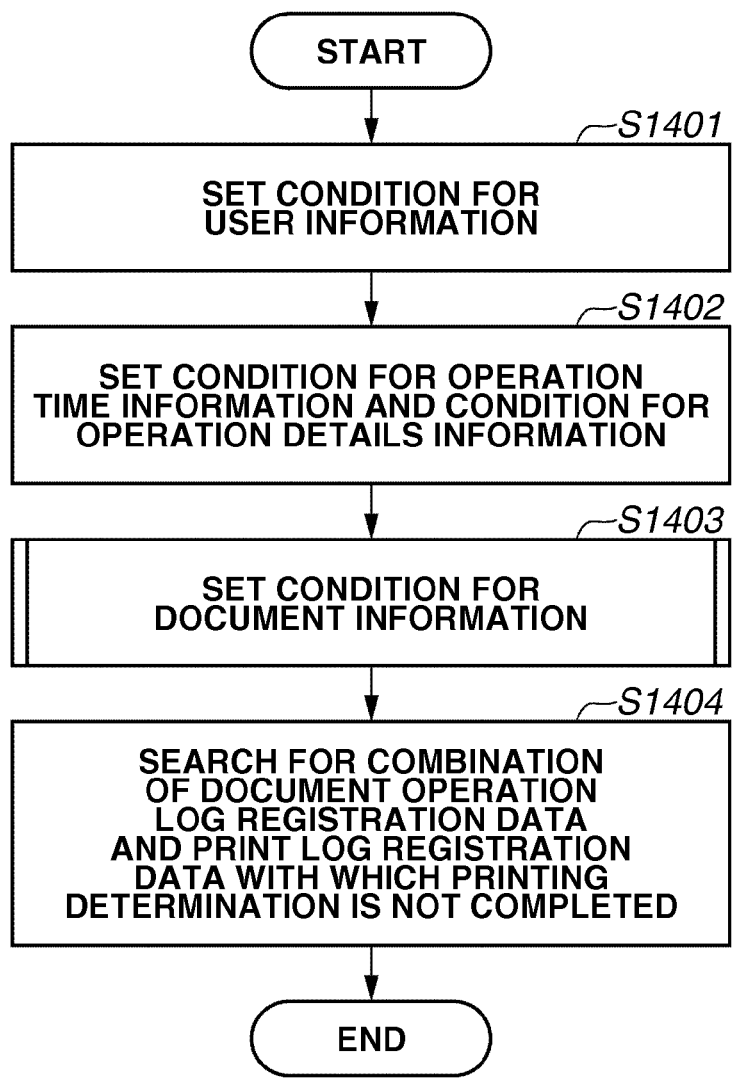
FIG. 14 is a flowchart illustrating processing of search 2 according to the second exemplary embodiment.

In search 2, as a result of printing, the document management main control unit 302 determines a document with which information "a document name and a character string indicating an external application" is recorded as the value of the "JOB NAME" attribute 504 of the print log registration data. Processing in search 2 will be described below with reference to FIG. 14.

In step S1401, the document management main control unit 302 performs similar processing to step S1301, and sets a comparison condition for the user information.

In step S1402, the document management main control unit 302 executes similar processing to step S1302, and sets a comparison condition for the operation date and time information and a comparison condition for the operation type information.

In step S1403, the document management main control unit 302 executes the processing in steps S1501 to S1506 (described below), and sets a comparison condition for document information in search 2.

In step S1404, the document management main control unit 302 searches for a combination of the document operation log registration data and the print log registration data satisfying all of the search conditions respectively set in steps S1401 to S1403. The print log registration data and the document operation log registration data with which printing determination is not completed are subjected to the search processing.

Figure 15:
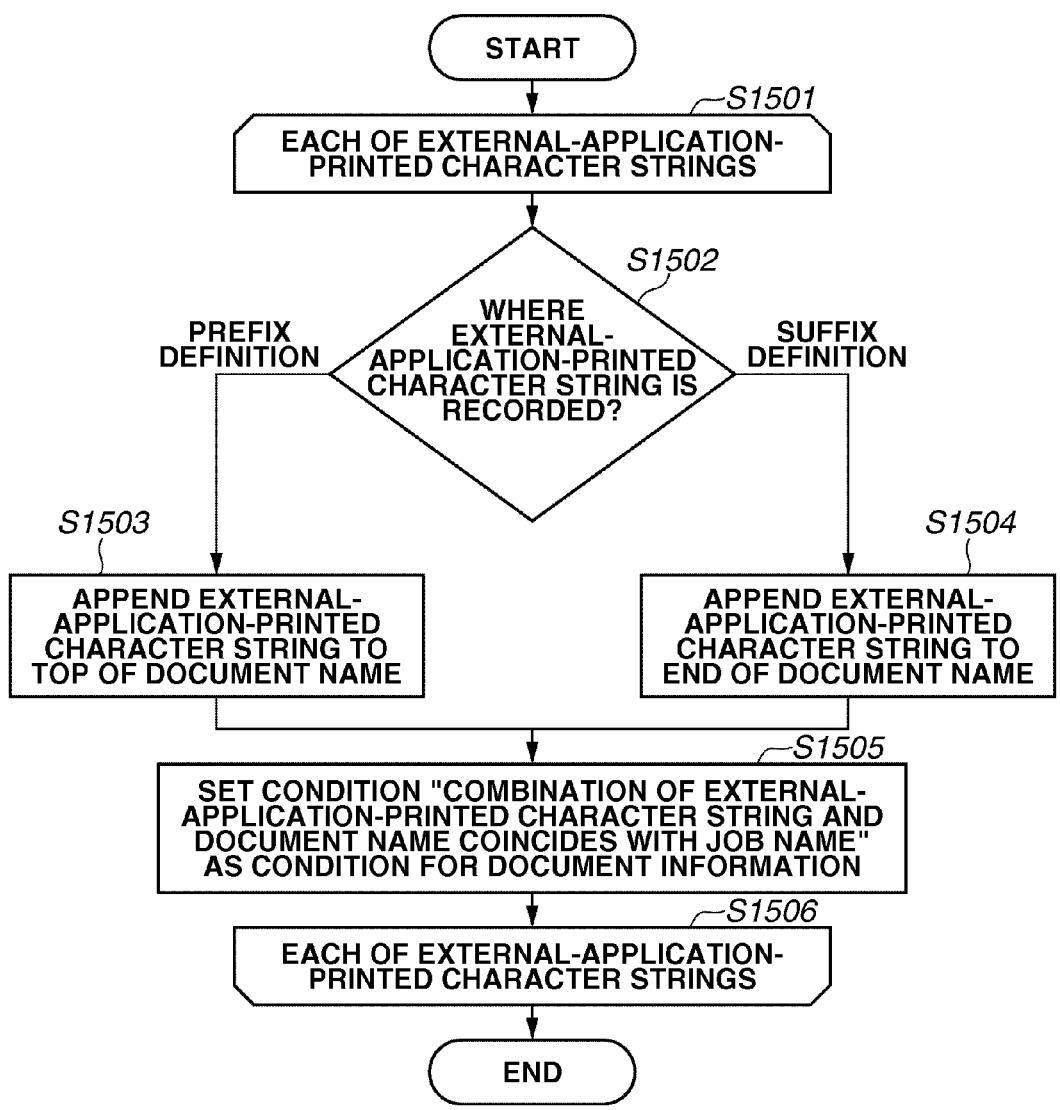
FIG. 15 is a flowchart illustrating processing for setting document information comparison conditions in search 2 according to the second exemplary embodiment.

Processing for setting a comparison condition for document information in search 2 will be described below with reference to FIG. 15.

In step S1501, the document management main control unit 302 acquires a character string (hereinafter referred to as "external-application-printed character string") indicating an external application based on the prefix definition 703 and the suffix definition 704 recorded in the external-application-specific information 701 of the external-application-specific information storage unit 307. Then, the document management main control unit 302 applies the processing in steps S1502 to S1506 to each "external-application-printed character string."

In step S1502, the document management main control unit 302 determines whether an "external-application-printed character string" is recorded in the prefix definition 703 or the suffix definition 704. When the string is recorded in the prefix definition 703 (PREFIX DEFINITION in step S1502), the processing proceeds to step S1503. When the string is recorded in the suffix definition 704 (SUFFIX DEFINITION in step S1502), the processing proceeds to step S1504.

In step S1503, the document management main control unit 302 appends the "external-application-printed character string" to the top of the value of the "DOCUMENT NAME" attribute 405, and acquires the resultant character string.

In step S1504, the document management main control unit 302 appends the "external-application-printed character string" to the end of the value of the "DOCUMENT NAME" attribute 405, and acquires the resultant character string.

In step S1505, the document management main control unit 302 sets a condition "the character string acquired in step S1503 or S1504 coincides with the "JOB NAME" attribute 504" as a comparison condition for document information. If the comparison condition for document information set in step S1505 already exists, the document management main control unit 302 adds the comparison condition to the existing condition on a logical sum (OR) basis.

In step S1506, the document management main control unit 302 determines whether the above-described processing is completed for all of "external-application-printed character strings" acquired in step S1501. When the processing is completed for all of "external-application-printed character strings", the processing exits this flowchart. Otherwise, when processing is not completed for any one "external-application-printed character string", the processing proceeds to step S1501 to process the following "external-application-printed character string."

For example, as a result of applying search 2 to the print log registration data records 521 to 527 of the print log 501 and the document operation log registration data records 421 to 430 of the document operation log 401, "the print log registration data record 525 and the document operation log registration data record 425" is acquired as a combination of the print log registration data and the document operation log registration data related to printed documents managed by the document management server.

Upon completion of processing of search 2, the processing proceeds to step S1206.

Figure 16:
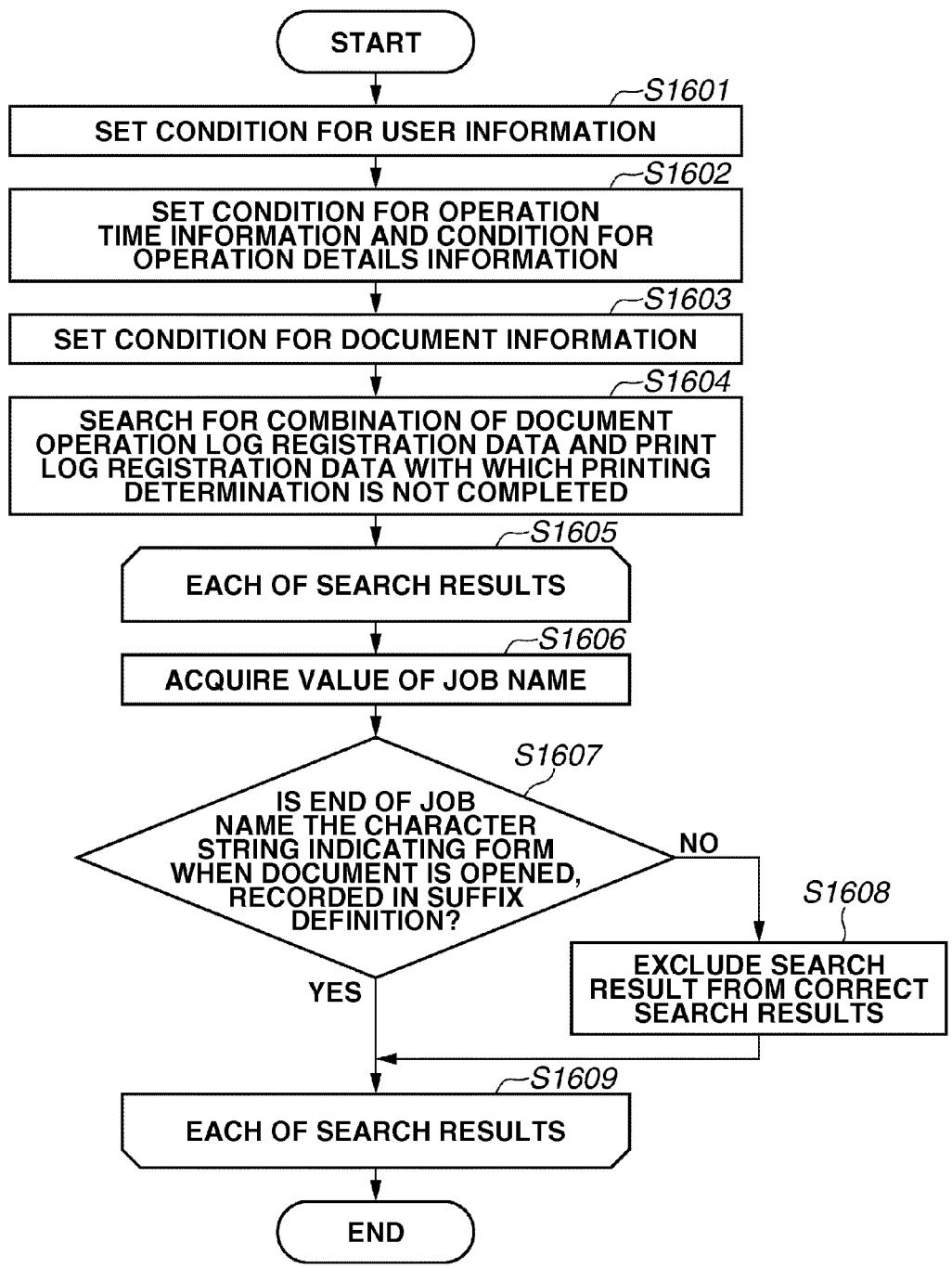
FIG. 16 is a flowchart illustrating processing of search 3 according to the second exemplary embodiment.

In search 3, as a result of printing, the document management main control unit 302 determines a document with which information "a document name and a character string indicating a document opening mode" or "a document name and a character string indicating an external application and a character string indicating a document opening mode" is recorded as the value of the "JOB NAME" attribute 504 of the print log registration data. Processing in search 3 will be described below with reference to FIG. 16.

In step S1601, the document management main control unit 302 executes similar processing to step S1301, and sets a comparison condition for the user information.

In step S1602, the document management main control unit 302 executes similar processing to step S1302, and sets a comparison condition for the operation date and time information and a comparison condition for the operation type information.

In step S1603, the document management main control unit 302 set the following condition (A) or (B) as a comparison condition for document information.

(A) As a result of prefix search for the value of the "DOCUMENT NAME" attribute 405, the value of the "JOB NAME" attribute 504 is matched.

(B) As a result of prefix search for a character string formed by appending an "external-application-printed character string" to the top or end of the value of the "DOCUMENT NAME" attribute 405 acquired in step S1503 or S1504, the character string of the "JOB NAME" attribute 504 is matched.

In step S1604, the document management main control unit 302 searches for a combination of the document operation log registration data and the print log registration data satisfying all of the search conditions respectively set in steps S1601 to S1603. The print log registration data and the document operation log registration data with which printing determination is not completed are subjected to the search processing.

In step S1605, the document management main control unit 302 executes the processing in steps S1606 to S1609 to each of the search results obtained by executing searches in step S1604.

In step S1606, the document management main control unit 302 acquires the value of the "JOB NAME" attribute 504 based on the information about the print log registration data included in the search result subjected to the processing in step S1605.

In step S1607, the document management main control unit 302 acquires a character string as a result of excluding the document name and the "external-application-printed character string" from the value of the "JOB NAME" attribute 504 acquired in step S1606. The document management main control unit 302 determines whether the character string is a part of the application character string, or all or a part of the character string indicating the form when a document is opened.

When the character string is determined to be a part of the application character string, or all or a part of the character string indicating the form when a document is opened (YES in step S1607), the processing proceeds to step S1609. Otherwise, when the character string is not determined that way (NO in step S1607), the processing proceeds to step S1608.

In step S1608, the document management main control unit 302 determines that the combination of the document operation log registration and the print log registration included in the search result subjected to the processing in step S1605 is not correct, and excludes the search result from correct search results.

In step S1609, the document management main control unit 302 determines whether the above-described processing is completed for all of the search results obtained as a result of searches executed in step S1604. When the processing is completed for all of the search results, the processing exits this flowchart. Otherwise, when processing is not completed for any one search results, the processing proceeds to step S1605 to process the following search result.

For example, as a result of applying search 3 to the print log registration data records 521 to 527 of the print log 501 and the document operation log registration data records 421 to 430 of the document operation log 401, "the print log registration data record 523 and the document operation log registration data 423" is acquired as a combination of the print log registration data and the document operation log registration data related to printed documents managed by the document management server.

Upon completion of processing of search 3, the processing proceeds to step S1206.

In search 4, as a result of printing, the document management main control unit 302 determines a document with which information "apart of document name", "a character string indicating an external application and a part of a document name", or "a document name and a part of character string indicating an external application" is recorded as the value of the "JOB NAME" attribute 504 of the print log registration data. Processing in search 4 will be described below with reference to FIG. 17.

In step S1701, the document management main control unit 302 executes similar processing to step S1301, and sets a comparison condition for the user information.

In step S1702, the document management main control unit 302 executes similar processing to step S1302, and sets a comparison condition for the operation date and time information and a comparison condition for the operation type information.

In step S1703, the document management main control unit 302 sets the following condition as a comparison condition for document information.

The value of the "DOCUMENT NAME" attribute 405 partially coincides with the value of the "JOB NAME" attribute 504.

In step S1704, the document management main control unit 302 searches for a combination of the document operation log registration data and the print log registration data satisfying all of the search conditions respectively set in steps S1701 to S1703. The print log registration data and the document operation log registration data with which printing determination is not completed are subjected to the search processing.

In step S1705, the document management main control unit 302 applies the processing in steps S1706 to S1712 to each of the search results obtained as a result of searches executed in step S1704.

In step S1706, the document management main control unit 302 acquires the value of the "DOCUMENT NAME" attribute 405 based on the information about the document operation log registration data included in the search result subjected to the current processing.

In step S1707, referring to the external-application-specific information 701, the document management main control unit 302 calculates a character string (hereinafter referred to as "predicted complete job name") predicted to be recorded in the "JOB NAME" attribute 504 of the print log registration data when a document indicated by the value of the "DOCUMENT NAME" attribute 405 acquired in step S1706 is printed.

In step S1708, the document management main control unit 302 acquires the value of the "PRINTER NAME" attribute 503 based on the information about the print log registration data included in the search result subjected to the current processing. Then, the document management main control unit 302 acquires the maximum number of bytes recordable in the "JOB NAME" attribute 504 of the print log registration data generated when a document is printed on a printer indicated by the value of the "PRINTER NAME" attribute 503.

In step S1709, with respect to the "predicted complete job name" calculated in step S1707, the document management main control unit 302 extracts a character string (hereinafter referred to as "predicted restriction job name") ranging from the first byte to the maximum number of bytes acquired in step S1708.

In step S1710, the document management main control unit 302 determines whether the value of the "JOB NAME" attribute 504 included in the information about the print log registration data included in the search result subjected to the current processing is exactly identical to the "predicted restriction job name" extracted in step S1709. When the two values are exactly identical (YES in step S1710), the processing proceeds to step S1712. Otherwise, when the two values are not exactly identical (NO in step S1710), the processing proceeds to step S1711.

In step S1711, the document management main control unit 302 determines that the combination of the document operation log registration data and the print log registration data included in the search result subjected to the current processing is not correct, and excludes the search result from correct search results.

In step S1712, the document management main control unit 302 determines whether the above-described processing is completed for all of the results of searches executed in step S1704. When the processing is completed for all of the search results, the processing exits this flowchart. Otherwise, when the processing is not completed for any one search result, the processing proceeds to step S1705 to process the following search result.

For example, as a result of applying search 4 to the print log registration data records 521 to 527 of the print log 501 and the document operation log registration data records 421 to 430 of the document operation log 401, "the print log registration data record 526 and the document operation log registration data record 421", "the print log registration data 527 and the document operation log registration data 427", and "the print log registration data 527 and the document operation log registration data 428" are acquired as combinations of the print log registration data and the document operation log registration data related to a printed document managed by the document management server.

Upon completion of processing of search 4, the processing proceeds to step S1206.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-189025 filed Aug. 31, 2011, which is hereby incorporated by reference herein in its entirety.

What is claimed is:

1. A document management system comprising:
    a document operation log recording unit configured to record, as an operation log of the document management system, a history of operations for each document managed by the document management system, wherein the document operation log recording unit cannot record an operation of printing executed by an external application out of a management of the document management system, and wherein the external application is different from a client application of the document management system;
    a print log collecting unit configured to collect, as a print log of a printing device, a history of printing executed by the printing device;
    a log comparison unit configured to compare the operation log recorded by the document operation log recording unit with the print log collected by the print log collecting unit;
    a document printing determination unit configured to determine, based on a result of comparison by the log comparison unit, whether the external application executed an operation of printing for a document managed by the document management system; and
    a document print information updating unit configured to update, based on a result of determination by the document printing determination unit, print information of each document managed by the document management system.

2. The document management system according to claim 1, wherein the log comparison unit includes:
    a name comparison unit configured to compare a document name recorded in the operation log with a job name recorded in the print log;
    a user name comparison unit configured to compare an operation user name recorded in the operation log with a print user name recorded in the print log; and
    a date and time comparison unit configured to compare a date and time of operation recorded in the operation log with a date and time of print start recorded in the print log.

3. The document management system according to claim 2, wherein the name comparison unit is configured to presume an original document name based on a job name recorded in the print log, and to compare the presumed document name with a document name recorded in the operation log.

4. The document management system according to claim 1, wherein the log comparison unit is configured to compare a log about document opening recorded in the operation log by the document operation log recording unit with the print log collected by the print log collecting unit.

5. The document management system according to claim 1, wherein the log comparison unit is configured to compare a log about new document registration recorded in the operation log by the document operation log recording unit with the print log collected by the print log collecting unit.

6. The document management system according to claim 2, wherein, when comparing the log about document opening recorded in the operation log with the print log, the date and time comparison unit is configured to determine, as a comparison criterion, whether the date and time of operation for document opening is between the date and time of print start recorded in the print log and a data and time earlier by a predetermined time period than the date and time of print start recorded in the print log.

7. The document management system according to claim 2, wherein, when comparing the log about new document registration in the operation log with the print log, the date and time comparison unit is configured to determine, as a comparison criterion, whether the date and time of operation for new document registration is earlier or later by a predetermined time period than the date and time of print start recorded in the print log.

8. A document management system comprising:
a document operation log recording unit configured to record, as an operation log of the document management system, a history of operations for each document managed by the document management system;
a print log collecting unit configured to collect, as a print log of a printing device, a history of printing executed by the printing device;
a log comparison unit configured to compare the operation log recorded by the document operation log recording unit with the print log collected by the print log collecting unit;
a document printing determination unit configured to determine, based on a result of comparison by the log comparison unit, whether each document managed by the document management system was printed;
a candidate document page count acquisition unit configured to read, when a plurality of candidate documents is determined as printed documents by the document printing determination unit, each candidate document managed by the document management system to acquire the number of pages of the candidate document;
a print page information acquisition unit configured to acquire print page information from the print log determined to have the plurality of candidate documents;
a print target page count calculation unit configured to calculate the number of pages to be printed based on the print page information acquired by the print page information acquisition unit;
a page count comparison unit configured to compare the number of pages of each candidate document acquired by the candidate document page count acquisition unit with the number of pages to be printed calculated by the print target page count calculation unit;
a print document identification unit configured to, based on a result of comparison by the page count comparison unit, identify a printed document out of the plurality of candidate documents; and
a document print information updating unit configured to update, based on a result of determination by the document printing determination unit and a result of identification by the print document identification unit, print information of each document managed by the document management system.

9. The document management system according to claim 8, wherein the candidate document page count acquisition unit is configured to acquire the number of pages of each document based on the number of slides of the candidate document.

10. The document management system according to claim 8, wherein the print page information includes print page count information, imposition information, and two-sided printing information.

11. The document management system according to claim 8, wherein the page count comparison unit is configured to determine, as a comparison criterion, whether the number of pages of candidate documents acquired by the candidate document page count acquisition unit is equal to or larger than the number of pages to be printed calculated by the print target page count calculation unit.

12. A document management method, comprising:
recording, as an operation log of a document management system, a history of operations for each document managed by the document management system, wherein an operation of printing executed by an external application out of a management of the document management system cannot be recorded as the operation log, and wherein the external application is different from a client application of the document management system;
collecting, as a print log of a printing device, a history of printing executed by the printing device;
comparing the recorded operation log with the collected print log;
determining, based on a result of comparison between the operation log and the print log, whether the external application executed an operation of printing for a document managed by the document management system; and
updating, based on a result of the determination, print information of each document managed by the document management system.

13. A non-transitory computer-readable storage medium storing a computer program for causing a computer to function as:
a document operation log recording unit configured to record, as an operation log of a document management system, a history of operations for each document managed by the document management system, wherein the document operation log recording unit cannot record an operation of printing a document executed by an external application out of a management of the document management system, and wherein the external application is different from a client application of the document management system;
a print log collecting unit configured to collect, as a print log of a printing device, a history of printing executed by a printing device;
a log comparison unit configured to compare the operation log recorded by the document operation log recording unit with the print log collected by the print log collecting unit;
a document printing determination unit configured to determine, based on a result of comparison by the log comparison unit, whether the external application executed an operation of printing for a each document managed by the document management system; and
a document print information updating unit configured to update, based on a result of determination by the document printing determination unit, print information of each document managed by the document management system.

* * * * *